United States Patent [19]

Kielbania, Jr.

[11] Patent Number: 4,507,342

[45] Date of Patent: Mar. 26, 1985

[54] POLYMERS ADHERENT TO POLYOLEFINS

[75] Inventor: Andrew J. Kielbania, Jr., Chalfont, Pa.

[73] Assignee: Rohm and Haas Company, Philadelphia, Pa.

[21] Appl. No.: 543,589

[22] Filed: Oct. 19, 1983

Related U.S. Application Data

[62] Division of Ser. No. 282,121, Jul. 10, 1981, Pat. No. 4,424,240, which is a division of Ser. No. 037,069, May 8, 1979, Pat. No. 4,288,499.

[51] Int. Cl.$^3$ .............................................. B32B 27/08
[52] U.S. Cl. ...................................... 428/90; 428/290; 428/394; 428/516; 428/522
[58] Field of Search ................ 428/343, 516, 518, 522, 428/290, 90, 394

[56] References Cited

U.S. PATENT DOCUMENTS

| | | | |
|---|---|---|---|
| 3,241,662 | 3/1966 | Robinson et al. | 428/343 |
| 3,258,433 | 6/1966 | Cantor et al. | 428/518 |
| 3,394,029 | 7/1968 | MacArthur | 428/518 |
| 3,519,531 | 7/1970 | James et al. | 524/811 |
| 3,887,738 | 6/1975 | Taft et al. | 428/516 X |
| 3,931,087 | 1/1976 | Baatz et al. | 524/814 |
| 4,012,560 | 3/1977 | Baatz et al. | 428/516 X |
| 4,288,499 | 9/1981 | Kiebania | 428/518 |

Primary Examiner—Thomas J. Herbert
Attorney, Agent, or Firm—Michael B. Fein

[57] ABSTRACT

This invention is concerned with an article comprising an untreated polyolefin substrate and adherent thereto a vinyl addition polymer of monomers comprising at least 5% by weight a primary monomer selected from (a) monomers having the formula

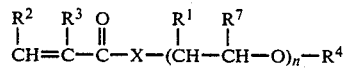

wherein
X is —O—, —NH— or —NR$^5$—;
R$^1$ and R$^7$, individually, are H, methyl or ethyl;
R$^2$ is H or an organic radical, preferably —COOH, —CONH$_2$ or —COOR$^6$;
R$^3$ is H or an organic radical, preferably methyl, other alkyl having up to about five carbon atoms, —CH$_2$COOR$^6$, —COOR$^6$ or —CH$_2$COOH;
R$^4$ and R$^5$, individually, are monocyclic alkyl having six or more carbon atoms, acyclic alkyl having nine or more carbon atoms, or alkaryl having nine or more carbon atoms;
R$^6$ is hydrocarbyl, preferably alkyl;
n has a value from zero to about ten;
(b) vinyl esters of alkanoic acids having at least eight carbon atoms;
(c) alkyl substituted styrenes wherein the substituent group or groups have a total of three or more carbon atoms;

and mixtures thereof; said polymer having surface energy properties such as to form a stable bond with said substrate.

The polymer, used alone or in a blend with other polymers, serves as a coating, a tiecoat, an adhesive or a binder.

15 Claims, No Drawings

POLYMERS ADHERENT TO POLYOLEFINS

BACKGROUND OF THE INVENTION

This is a division of application Ser. No. 282,121 filed July 10, 1981 now U.S. Pat. No. 4,424,240, which is a division of application Ser. No. 037,069 filed May 8, 1979, now U.S. Pat. No. 4,288,499.

Polyolefins, particularly polypropylene, have inert surfaces, thus are not readily bonded by other materials. Various surface treatments such as flame oxidation, corona discharge and chemical etching have been used to activate these surfaces with some measure of success. This invention concerns articles comprising polymers bonded to polyolefin surfaces, particularly to untreated polyolefin surfaces and most particularly to the difficult to wet untreated polypropylene surfaces. These polymers comprise mer units having comparatively non-polar and non-polarizable groups, other than small groups, extending from the polymer backbone. In various embodiments the adherent vinyl polymers, or bonded polymers, appear as adhesive coats, tiecoats, topcoats or as components of these. Articles exemplifying embodiments of this invention include nonwoven fabrics, woven fabrics and flocked fabrics, all comprising polyolefins and other materials; and decorated polyolefins in which the pigment, dye or other decoration is bonded by the adherent polymer.

It is known to employ certain, relatively expensive, chlorinated polymers as primers to enhance the bonding of materials to untreated polyolefin surfaces. It may be speculated that these polymers are actually a form of chemical etching by means of their slow release of strong acid or strongly oxidizing materials. Chlorinated mixtures of a hydrocarbon resin and polyethylene are taught for use as primers and paint and ink additives for improving adhesion of coatings to polyolefin, by Etter in U.S. Pat. No. 4,070,421. Chlorinating carboxyl-group-containing polyolefins to form primer coatings for untreated polyolefin substrates is taught in U.S. Pat. No. 3,579,485. Menikheim et al., in U.S. Pat. No. 3,380,844 teach the coating of polyolefin film by a polymer of vinylidene chloride, a (meth)acrylate ester and (meth)acrylic or itaconic acid. The polymers are recited as having non-strippable adhesion to polyolefin substrates. Acrylic esters having alkyl groups containing more than two carbon atoms were found to be not entirely satisfactory in these polymers.

Polymers other than chlorinated polymers have also been adhered to polyolefins. Agouri et al. teach a process for chemical modification of polyolefins by grafting polar monomers onto the polyolefin by means of a free radical generating material, in U.S. Pat. No. 4,080,405, to produce a polyolefin surface having improved wettability. MacArthur, in U.S. Pat. No. 3,394,029, teaches the coating of polyolefin surfaces by polymers of certain terpene acrylates and N-terpene acrylamides for improved adhesion of conventional lacquer topcoats. Chancler et al., in U.S. Pat. No. 4,014,645, teach the enhancement of dye receptivity of polyolefin materials used in fabric manufacture by coating the polyolefin with a self-curing polymeric binder containing a quaternary ammonium salt. Emmons et al., in U.S. Pat. No. 4,097,677, disclose certain radiation curable coatings, useful to coat some polyolefins; the coatings comprising monomeric unsaturated esters of glycol monodicyclopentenyl ethers. In British Pat. No. 1,177,199, there is disclosed nonwoven webs containing a major amount of polypropylene fibers bonded with a binder comprising vinyl acetate, ethylene and an unsaturated N-methylol amide or an alkyl ether thereof. It is pointed out that "as is well known, it is extraordinarily difficult to bond polypropylene to itself or to other materials." (page 1, line 53). Robinson et al., in U.S. Pat. No. 3,241,662, teach the preparation of a roll of biaxially oriented polypropylene film having an activated surface and adherent to the activated surface a pressure sensitive adhesive which does not adhere to the untreated surface. The polymer is a polymer of about 55 to 95% of an alkyl ester of acrylic or methacrylic acid with the alkyl group preferably having 6 to 12 carbon atoms, up to 12% of an unsaturated carboxylic acid or unsaturated aliphatic amide and various other comonomers. Cantor et al., in U.S. Pat. No. 3,258,443, describe a latex which may be used to deposit a pressure-sensitive adhesive on polyethylene and polypropylene. The latex is prepared from 1 to 45% vinyl acetate, 50 to 98% of an alkyl acrylate having an alkyl group of between 4 and 10 carbon atoms (several acyclic alkyl groups are named) and 1 to 5% of an unsaturated carboxylic acid. The alkyl group containing 4 to 10 carbon atoms preferably contains at least 6 straight chain carbon atoms and most preferably is the 2-ethylhexyl group. James et al., in U.S. Pat. No. 3,519,531, disclose certain copolymers of ethylene and vinyl esters of alkenolic acids and alkyl esters of acrylic or substituted acrylic acid, for coating polypropylene film. Taft et al., in U.S. Pat. No. 3,887,738, teach hot melt compositions comprising a copolymer of ethylene and vinyl acetate and/or alkyl acrylate useful as an adhesive for the back sizing of tufted carpets which may comprise polypropylene backing materials. Two patents to Baatz et al., U.S. Pat. Nos. 3,931,087 and 4,012,560 teach the use of copolymers of a sulfonic acid and esters of acrylic or methacrylic acids as pressure sensitive adhesives which are adherent to a number of surfaces including polyethylene and polypropylene. Peterson, in U.S. Pat. No. 3,524,795, teaches layered barrier packaging films employing polyolefin outer layers and a gas barrier inner layer bonded together by adhesives such as chlorinated polyethylene, a copolymer of ethylene and vinyl acetate, and copolymers of ethylene and certain lower acrylates.

There is taught, in the present invention, articles comprising polymers surprisingly adherent to polyolefin surfaces especially untreated polyolefin surfaces and more particularly untreated polypropylene surfaces. Untreated polyolefins, particularly untreated polypropylene have not been commercially employed to the extent desired because of the difficulty in finding adhesive compositions suitable for coating or adhering other materials to this polypropylene. The present vinyl addition polymers are surprising in giving excellent adhesion to untreated polypropylene without the use of chlorinated or other halogenated polymeric materials. They also make unnecessary cumbersome and expensive pretreatments such as corona discharge, heat and flame treatments, treatment with chemical agents such as ozone, halogens, chromic acid or bombardment by electrons.

BRIEF DESCRIPTION OF INVENTION

This invention concerns a vinyl addition polymer adherent to a polyolefin substrate especially an untreated polyolefin substrate and most particularly an untreated polypropylene substrate. The substrate may be in any of the various forms in which the polyolefins are commonly used such as bulk articles, thick sheets, thin films, slit films, woven slit films, fibers, cut fibers, yarn and the like. The vinyl addition polymer is a polymer of monomers comprising at least 5% by weight of a primary monomer selected from:

(a) monomers having the formula

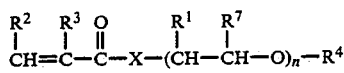

wherein
X is —O—, —NH— or —NR$^5$—;
R$^1$ and R$^7$, individually, are H, methyl or ethyl;
R$^2$ is H or an organic radical, preferably —COOH, —CONH$_2$ or —COOR$^6$;
R$^3$ is H or an organic radical, preferably methyl, other alkyl having up to about five carbon atoms, —CH$_2$COOR$^6$, —COOR$^6$ or —CH$_2$COOH;
R$^4$ and R$^5$, individually, are monocyclic alkyl having six or more carbon atoms, acyclic alkyl having nine or more carbon atoms, or alkaryl having nine or more carbon atoms;
R$^6$ is hydrocarbyl, preferably alkyl;
n has a value from zero to about ten;

(b) vinyl esters of alkanoic acids having at least eight carbon atoms;

(c) alkyl substituted styrenes wherein the substituent group or groups have a total of three or more carbon atoms; and mixtures thereof. The polymer has surface energy properties such as to form a stable bond with the polyolefin substrate. In more quantitative terms, it is preferable that the total surface energy of the polymer be between about 22 and 42 dynes/centimeter; said energy having a non-polar dispersive component between about 20 and about 38 dynes/centimeter and a polar component up to about 15 dynes/centimeter with said polar component being not over about 36% of the total surface energy. It is further preferred that the polymer have an average solubility more than 0.25 gm. per 100 ml. in the low solubility parameter solvents isooctane, n-pentane, 1-hexene, diisobutylene, and cyclohexane.

This invention relates to articles comprising a polyolefin and an adherent vinyl addition polymer in which the polyolefin is a rigid substrate, such as a painted or decorated polyolefin in which the vinyl addition polymer is employed in the paint or decorative coating, or as a tiecoat between the decoration or coat and the polyolefin or as an adhesive such as for bonding a textile fabric to the polyolefin. The coating may have other purposes in addition to or other than decoration. Examples are polyurethane or polyester foams or polyvinyl chloride films adhered to the polyolefin. Such other purposes include protection of the polyolefin, furnishing an article with additional properties such as cushioning, barrier or non-skid properties etc. Other embodiments include flock coated polyolefin. Among the uses of the vinyl addition polymers on flexible polyolefin surfaces are laminations, including lamination of textile fabrics and flocked materials and thin films such as polyvinyl chloride film. A further example of the use of the vinyl addition polymer is to serve as a dyeable coating for polypropylene such as polypropylene fabric, fabric containing polypropylene flock and polypropylene plastic materials. The adherent vinyl addition polymers, alternatively described as vinyl addition polymeric adhesives, range from materials having a low glass transition temperature (Tg), and soft and sticky, to those with a comparatively high Tg and hard and tough or brittle as desired and obtainable by compositional and molecular weight variation.

This invention also relates to processes for preparing the invented articles.

DETAILED DESCRIPTION

The polyolefins which are the substrates of this invention comprise in particular olefin polymers, especially polymers of olefins containing 2 to 8, and preferably 2 to 5 and most preferably 3 carbon atoms. The polyolefins include, without being limited thereto, polyethylene, polypropylene, polybutenes, polypentenes, and copolymers of these with small amounts of other monomers with which they are copolymerizable. Included are such copolymers containing at least 85% by weight of olefin units, as defined by the Textile Fiber Products Identification Act (Public Law 85-897). Such polyolefins may be in the form of fibers, granules, films, woven forms and nonwoven forms, such as woven slit film and spun bonded polyolefins, polyolefin tape, sheet and block. The polyolefins may be heat set or molded forms. Included are oriented, including biaxially oriented, polyolefin films especially oriented polypropylene films. Of greatest importance is the group of polyolefins known as "untreated polyolefins" and particularly "untreated polypropylene". As has been recited above, untreated polyolefin surfaces are difficult to bond as well as to wet. The difficulty is often ascribed to the non-polar and hydrophobic nature of the purely hydrocarbon surface present on these materials. Polypropylene has been singled out as being especially difficult and it has been hypothicated that the reason for the particular difficulty in bonding to untreated polypropylene is that the surface consists essentially of methyl groups. The vinyl addition polymers of this invention adhere to these difficult to wet and difficult to bond surfaces.

The articles of this invention comprise a polyolefin substrate, as described above, and adherent thereto a vinyl addition polymer of monomers comprising at least about 5% by weight, and in some uses preferably at least 25% and most preferably at least about 50%, a primary monomer selected from (a) monomers having the formula

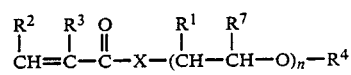

wherein
X is —O—, —NH— or —NR$^5$—;
R$^1$ and R$^7$, individually, are H, methyl or ethyl;
R$^2$ is H or an organic radical, preferably —COOH, —CONH$_2$ or —COOR$^6$;
R$^3$ is H or an organic radical, preferably methyl, other alkyl having up to about five carbon atoms, —CH$_2$COOR$^6$, —COOR$^6$ or —CH$_2$COOH;
R$^4$ and R$^5$, individually, are monocyclic alkyl having six or more carbon atoms, acyclic alkyl having nine or more carbon atoms, or alkaryl having nine or more carbon atoms;
R$^6$ is hydrocarbyl, preferably alkyl;
n has a value from zero to about ten;

(b) vinyl esters of alkanoic acids having at least eight carbon atoms;

(c) alkyl substituted styrenes wherein the substituent group or groups have a total of three or more carbon atoms;

and mixtures thereof and optionally (2) one or more substituted ethylene supplementary monomers; said polymer having surface energy properties such as to form a stable bond with said substrate.

$R^4$ and $R^5$ are large terminal groups believed to be principally responsible for the adhesion to the polyolefin. The monocyclic alkyl group having 6 or more carbon atoms preferably has 6 to 20 carbon atoms and most preferably is cyclohexyl or an alkyl substituted cyclohexyl group. The acyclic alkyl group having 9 or more carbon atoms is preferably one having 9 to 20 carbon atoms and most preferably having 10 to 14 carbon atoms. The alkaryl group having 9 or more carbon atoms is preferably one having 10 to 18 carbon atoms, and one alkylated benzene ring.

The monomers of group (a) above are esters or amides of certain unsaturated acids, preferably acrylic or methacrylic. Examples of $R^2$ and $R^3$ and of the acids which may be considered the precursor of the monomers are:

| $R^2$ | $R^3$ | Acid for Carboxyl Source |
|---|---|---|
| H | H | acrylic |
| $CH_3$ | H | methacrylic |
| H | COOH | maleic, fumaric |
| H | $CONH_2$ | maleamic |
| $CH_2COOCH_3$ | H | methyl acid itaconate |
| $CH_2COOH$ | H | itaconic |
| $CH_2COOH$ | COOH | aconitic |
| H | $COOCH_3$ | half ester of maleic |

In group (a) monomers $R^6$ is preferably alkyl and most preferably has up to eight carbon atoms.

The alkenoic acids having at least 8 carbon atoms are preferably acids or a mixture of such acids having up to 20 carbon atoms and most preferably 9 to 11 carbon atoms. The substituted styrenes wherein the substituent group or groups have a total of 3 or more carbon atoms preferably are those in which the substituents have a total of 3 to 15 carbon atoms and most preferably 4 to 8 carbon atoms, such as t-butyl styrene.

Many of the primary monomers are esters or amides of ethylenically unsaturated acids such as acrylic, methacrylic, crotonic, fumaric, maleic, and itaconic; of these the preferred acids are acrylic, methacrylic, itaconic and maleic with acrylic and methacrylic being most preferred although in some embodiments itaconic is most preferred. The amides of this invention are the amides of these acids with the preferred amides being those corresponding to the preferred acids. Further with respect to the amides, although the di-N-substituted amides are useful the mono-N-substituted amides are preferred. Examples of these primary monomers are cyclohexyl acrylate, cyclohexyl methacrylate, cyclohexyl itaconate, cyclohexyl maleate, dicyclohexyl maleate, 3-butyl-cyclohexyl acrylate, all of the decyl acrylates, including n-decyl and isodecyl, all of the decyl methacrylates including n-decyl and isodecyl, n-decylacrylamide, isodecyl methacrylamide, esters of the acids esterified with dodecyl alcohol, lauryl alcohol, stearyl alcohol and the corresponding various branched chain alcohols especially dodecyl acrylate and methacrylate, lauryl acrylate and methacrylate, myristyl acrylate and methacrylate, the mono and di N-substituted amides of the aforementioned acids having the same alkyl group as these ester monomers.

The, up to 95% by weight, comonomers in the adherent polymer are any of the well known unsaturated addition polymerizable vinyl monomers.

The polymers of this invention are prepared by any of the well known methods of free radical polymerization of ethylenically unsaturated monomers such as bulk, emulsion, solution, nonaqueous dispersion and suspension polymerization. Of the various methods, solution polymerization and emulsion polymerization are preferred. It is also known to control the molecular weight of the produced polymer by means such as polymerization temperature, initiator concentration and mode of addition, and chain transfer agent concentration and mode of addition. For excellent flow of the neat polymer and low extensibility, i.e., little "leggyness", of the adhesive polymer comparatively low molecular weight material, such as from about 3,000 to about 50,000, is useful and is preferably made by solution polymerization. A polymer with more toughness is obtained when the molecular weight is in the range of 50,000 to 300,000 and is preferably made by solution polymerization or emulsion polymerization. For the greatest toughness emulsion polymerization is used in the absence of molecular weight limiting components and yields molecular weights above 300,000 with values of two million being achievable. Still higher molecular weights and insolubility of the polymer are obtained by employing crosslinking monomers among the monomers in the polymer. Crosslinking normally results in improved resistance to solvents, such as drycleaning solvents, in improved resistance to chemical attack, such as by aqueous detergents in washing, and in improved thermal stability. Addition crosslinking monomers are polyethylenically unsaturated copolymerizable monomers, such as divinylbenzene, diallyl maleate, diallylphthalate, ethylene glycol diacrylate or dimethacrylate, glycerol triacrylate and so forth.

A more preferred way of producing crosslinked polymers of this invention is to prepare the polymer in a crosslinkable form and then in a separate step, ordinarily after application to the substrate, achieve crosslinking by a subsequent chemical reaction such as a further addition reaction or a condensation reaction. The further reaction can occur between functional groups already present in the mer units of the polymer chain or by reaction of functional groups on the polymer chain with an external crosslinker. The crosslinking reaction may be initiated by free radical initiators, by thermal activation, by radiation, by loss of water or other small molecules as in a condensation reaction, by pickup of water from the atmosphere, etc. The various reactions may be accelerated by heat or radiant energy such as ultraviolet radiation or electron beam curing as is well known in the art.

A wide variety of functional groups is useful for producing crosslinking particularly with an external crosslinking agent. Such groups may be present at levels up to about 20% although 0.02% to 10% is preferred and 0.1% to 3% is most preferred. Mer units comprising pendant amido groups, including alkylamido, alkoxyamido and alkoxyalkylamido (both mono- and di- in each case) are useful. Examples of such groups are acrylamido, methacrylamido, methoxymethylacrylamido, butoxymethylmethacrylamido, methylacrylamido and so forth. These groups are crosslinkable with external aminoplasts as well as internally with each other employing well known aminoplast chemistry. The reactions are normally enhanced by the use of acid catalysis which may include catalysis by acid groups on the polymer itself. The groups may be crosslinked by epoxy crosslinkers, normally used as external crosslinkers and again acid catalysis may be employed. Polycarboxylic molecules and polyhydroxyl molecules, small molecules or polymeric molecules, are also useful as crosslinkers for the amido groups and are also catalyzed by acids.

The hydroxyl groups, carboxyl groups or epoxy groups may alternatively be on the polymer and be crosslinked by other mer units on the polymer or external crosslinking agents. Mercapto groups may be substituted for hydroxyl groups in the crosslinking systems. Preferably, polymer hydroxyl groups are crosslinked by external aminoplasts using acid catalysis. Polymer carboxyl groups are readily crosslinked by external epoxy groups and in this case base catalysis, such as by the use of simple amines, for example triethanol amine or benzyl dimethylamine, can be used. Epoxy groups in the polymer are preferably crosslinked by polycarboxylic compounds and catalyzed either by acids or bases which may be either internal (in the polymer) or external. An example of an internal base is a mer unit derivable from an amine monomer such as dimethylaminoethylmethacrylate or a quaternary ammonium monomer. More specifically the coating may be thermosetting, i.e., be subject to latent crosslinking. Such polymers are made with monomers which contain reactive groups capable of reacting with themselves or with other groups present in the polymer chain to impart crosslinking during heating or fusion of the coating. Where addition polymers are involved, monomers which are suitable for this function include certain acrylics having crosslinkable functionality exemplified by the following: acrylic acid; methacrylic acid; acrylamide; methacrylamide; epoxyalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the latent crosslinking reactions which are possible using heat and/or catalysis are:

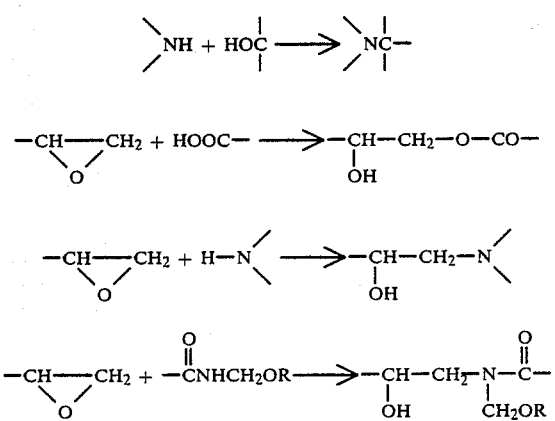

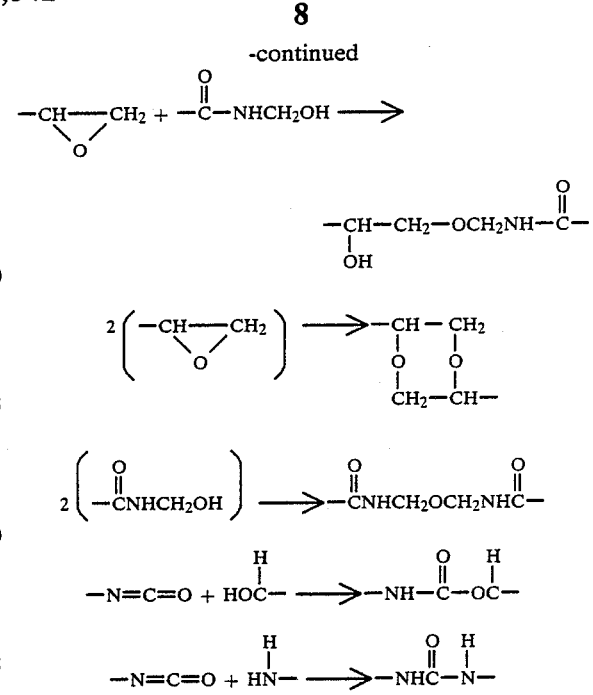

Addition polymerizable unsaturated monomers containing such groups are well known in the art. Functional monomers of use are disclosed in U.S. Pat. Nos. 3,446,777 to W. D. Emmons, 3,150,118 to D. H. Clemens and 3,266,930 to W. D. Emmons and E. Hankins Owens, all incorporated herein by reference.

A preferred crosslinking system employs the unsaturated quaternary ammonium monomers of S. N. Lewis et al. taught in U.S. Pat. No. 3,678,098, incorporated herein by reference. A particular advantage of the Lewis et al. crosslinking system is the ability to crosslink at temperatures below the distortion temperature of the polyolefin. Another advantage of the Lewis et al. crosslinking system is, due to its being a quaternary ammonium system and thus cationic, that it is particularly dyeable by dyes such as acid dyes, metallized dyes and direct dyes. Other thermosetting systems can be used, such as the aminoplast-modified alkyds described in U.S. Pat. No. 2,648,642 to Spencer, and the aminoplast-modified acrylics described in U.S. Pat. Nos. 2,978,433 to Hurwitz, 3,082,184 to Falgiatore et al., 3,183,282 to Hurwitz, and 3,235,622 to Clemens et al. Formulation with external crosslinkers has long been conventional in the art thus the procedures and ratios are well known.

When between about 5% and about 25%, by weight, of the primary monomers (a), (b) or (c) are employed, it is preferred that the average solubility parameter, averaged by weight percent, of the supplementary monomers be 8.8 or less; in the 25 to 50% range of the primary monomers it is preferred that the supplementary monomers have an average solubility parameter of less than 9.2. When greater than about 50% of the primary monomers is utilized in the copolymer any other copolymerizable monomers are employed. Solubility parameters of monomers and other molecules are described in detail in "Polymer Handbook", Second Edition, J. Brandrup and E. H. Immergut, Editors (John Wiley & Sons, New York 1975) Section IV Part 15 Entitled "Solubility Parameter Values" by H. Burrell, pages IV-337 to 359, herein incorporated by reference.

Burrell defines solubility parameter, describes how it is determined and calculated, and gives tables of the solubility parameter as well as further references to the scientific literature of this property. In the Burrell chapter there is also taught methods of calculating the solubility parameter from structural formulas utilizing tables of group molar attraction constants, see page IV-339. The table of Small is preferred. Typical solubility parameter values are given in the following table.

| Monomer | Solubility Parameter |
| --- | --- |
| α-methyl styrene | 8.5 |
| 2-ethylhexyl acrylate | 7.8 |
| ethyl methacrylate | 8.3 |
| ethyl acrylate | 8.8 |
| isobutyl acrylate | 8.5 |
| butyl acrylate | 8.6[1] |
| butyl methacrylate | 8.2 |
| vinyl ethyl ether | 7.8[1] |
| vinyl propyl ether | 7.9[1] |
| vinylbutyl ether | 7.9[1] |
| vinyl 2-ethylhexanoate | 8.1[1] |
| vinyl 2-ethylhexy ether | 8.0[1] |
| vinyl isobutyl ether | 7.9[1] |
| vinyl methyl ether | 7.0[1] |
| vinyl 2,6,8-trimethyl-4-nonyl ether | 7.5[1] |
| vinyl butyl carbitol | 8.7[1] |
| vinyl butyrate | 8.7[1] |
| hexyl acrylate | 8.7[1] |
| vinyl chloride | 7.8[1] |
| vinyl acetate | 9.0 |
| vinyl toluene | 9.1 |
| methyl acrylate | 8.9 |
| methyl methacrylate | 9.2[1] |
| vinyl propionate | 8.9[1] |
| dibutyl maleate | 9.0 |
| allyl acetate | 9.2 |
| vinyl ethyl carbitol | 8.9[1] |
| vinyl methyl cellosolve | 9.0 |
| acrolein | 9.8 |
| styrene | 9.3 |
| maleic anhydride | 13.6 |
| diethyl maleate | 9.9 |
| acrylic acid | 12.9[1] |
| acrylonitrile | 10.6[1] |
| vinyl carbitol | 11.0[1] |
| vinyl crotonate | 9.4[1] |

[1]Values from K. L. Hoy Journal of Paint Technology, Vol 42 pp 76–118 (1970) others are from H. Burrell, supra.

The term "vinyl monomer" as used herein means a monomer comprising at least one of the groups vinylidene, vinyl or vinylene. The preparation of these polymers is taught in several of the examples as well as in standard texts on the subject such as "Polymer Processes" by Schildknecht, Interscience, New York (1956) and "Emulsion Polymerization" by Blackley, Wiley, New York (1975). Mixtures of the vinyl polymers prepared by different methods or by the same method are also useful in this invention.

In addition to the surface energetics required for good adhesion to polyolefins, for specific uses a given hardness or softing temperature is desirable. The desired hardness or softing temperature is obtained by copolymerizing harder or softer monomers with the primary vinyl addition monomers (a), (b) or (c) to achieve the desired hardness or softing range. This is controlled by the glass transition temperature, Tg, of the copolymer. To increase hardness and to raise the softening temperature comonomers are used whose homopolymer Tg is greater than that of the primary vinyl monomer. Two of the preferred primary monomers have relatively high Tg values; t-butyl styrene at 130° C. and cyclohexyl methacrylate at 83° C. Tg is a conventional criterion of polymer hardness described in "Principles of Polymer Chemistry" by Flory, see especially pages 56 and 57, Cornell University Press (1953). Lists of Tg of high molecular weight homopolymers are widely available such as in "Polymer Handbook", supra, Section III. Measurements or Tg may be made on polymers samples. Tg may be calculated for copolymers as described by Fox, Bull. Am. Physics Soc. 1,3, p. 123 (1956).

To form a stable bond with a polyolefin substrate the adherent vinyl addition polymer must have the appropriate surface energy properties. It is believed, these properties are necessary to form an intimate bond between the polymer and the polyolefin as well as to prevent the intrusion or to promote the elimination of foreign liquids and gasses from the microscopic and submicroscopic interstices on the surface of the polyolefin. Such foreign material would be a barrier to the intimate contact between polymer and polyolefin. Although I do not wish to be bound by any specific theory of operation of adhesive forces, it appears that high adhesion is obtained by both high intimacy of contact, due to exclusion of air or foreign liquids from the interface, and high bonding forces across the interface between the polyolefin and the adherent vinyl addition polymer. These effects are achieved in a balanced manner when the surface energy properties of the vinyl addition polymer are appropriate. The surface energy properties of the adherent vinyl addition polymer are determined by placing a drop of water and separately a drop of methylene iodide on a plane surface of the adherent polymer and determining the angle of contact between the liquid, water in the one case and methylene iodide in the other, and the polymer at the edge of the drop. From these two data there is calculated, the total surface energy of the adherent polymer and the non-polar dispersive component and polar component of this energy; these being the only two components the sum is the total surface energy. It is preferred that the total surface energy be between about 22 and about 42 dynes per centimeter, having a non-polar dispersive component between about 20 and about 38 dynes per centimeter and a polar component up to about 15 dynes per centimeter. In general it is preferred that the polar component be not over about 36% of the total surface energy. An even more preferable range for the total surface energy is from about 26 to about 39 dynes per centimeter with a non-polar component being between about 22 and about 36 dynes per centimeter and the polar component being up to about 14 dynes per centimeter.

Additionally it is found desirable that the solubility of the adherent vinyl addition polymer in certain low solubility parameter solvents, i.e., isooctane, n-pentane, 1-hexene, diisobutylene and cyclohexane, average 0.25 gm per 100 ml or greater. It is preferable that the average solubility in these solvents be over 0.35 gm/100 ml and even more preferable that it be over 0.50 gm/100 ml.

A stable bond between the polyolefin and the adherent vinyl addition polymer is demonstrable by a peel adhesion test. Using the 180° adhesion peel strength tests described below, (employing a 30 cm per minute crosshead speed), preferably the second method described, with untreated polypropylene sheet as the substrate, a value greater than one lb. per inch indicates a stable bond. Preferably the bond stability is such that the 180° peel strength (at 30 cm per minute) is greater than two lbs. per inch and most preferably greater than four lbs. per inch or even five lbs. per inch. Ordinarily the test is performed at room temperature but in the case of a polymer having a Tg above zero degrees C. the 180° peel strength measurement is made at a temperature 20 degrees C. above the Tg. When a cohesive failure is observed the temperature at which the test is performed is lowered until an adhesive failure to the polypropylene is observed or the Tg of the polymer is reached. Measurement at low temperatures is often required for adherent polymers having low Tg, such as below −20° C.

A particularly useful embodiment of this invention comprises a blend of a latex of the adherent vinyl polymer of this invention and another latex. Preferably, the adherent polymer comprises at least 2% of the polymer solids of the blend, more preferably it is 10 to 60% and most preferably 20 to 40% of the latex polymer solids. It is also preferred that the blend have the total surface energy and surface energy component values such as to form a stable bond with the polyolefin. In blends with other polymers, particularly other polymer emulsions, the other component will ordinarily contain mer units useful for embracing additional desirable properties, such as dyeability, crosslinking, softness (or hardness) etc.

The adherent vinyl addition polymer in solution, in suspension, in an aqueous dispersion or in other form can be used "as is" or formulated with other ingredients customary to achieve given application or end use properties. Thickener is used, the amount being adjusted in a convenient manner to achieve the consistency suitable for application by the particular technique employed. Normally, the pH of aqueous compositions is adjusted in achieving the desired consistency. Another desirable ancillary component, in water borne systems, is a volatile water soluble organic antifreeze agent. Ethylene glycol and other glycols and polyglycols are especially useful for this purpose at concentrations up to about 5% by weight of the total composition. Additional stabilizing surfactants generally added at about 0.1 to about 5% may be desirable to achieve added stability in an aqueous system. Aqueous systems containing surfactants often require the addition of antifoam agents to minimize foaming. Such agents are well known and include high boiling alcohols, polyglycols and silicone liquids. If long term stability is desired, preservative or fungicidal agents can be used in their usual small effective proportions. Particularly with the higher glass temperature compositions of this invention, plasticizers, when added in minor proportions up to 20% by weight of the polymer, are effective. Other auxiliary materials that may be used include: dispersing agents for dispersing and maintaining in a finely divided state tinting colors, sequestering agents for controlling polyvalent metal ions, humectants, such as water soluble gums and salts of polyacrylic acid and glycols and polyglycols, bactericides and fungicides, perfumes and masking agents, corrosion inhibiting agents and so forth. Another group of auxiliary materials are ultraviolet light adsorbers, particularly for color and polymer stabilization. All of these are generally present at less than 8%, most commonly less than 4%.

NONWOVEN WEBS

This invention relates to nonwoven webs, such as in the form of carpets, containing polyolefin fibers and a binder comprising the adhesive vinyl addition polymer described above. It is well known that it is extraordinarily difficult to bond polyolefins particularly polypropylene and this is especially evident in nonwoven carpet web bonding because of the comparatively small surface area of the fiber available for bonding. Nonwoven web containing a major amount of polypropylene fibers, including those which consist essentially or entirely of polypropylene fibers, and bonded by the polymer of this invention are unexpectedly strong and thus useful in many industrial carpets as well as home carpet applications. These carpets are particularly suitable for indoor-outdoor carpeting where stability of the adherent polymer to temperature extremes as well as light, moisture and various other weathering stresses is desired. The fibers in the nonwoven web may be ordered or haphazardly distributed. The mat may be formed by carding when the fibers are of such character, by virtue of length and flexibility, as to be amenable to the carding procedure. The fibers need not be exclusively polyolefin and may comprise natural textile fibers such as hemp or cotton, as well as artificial organic textile fibers or filaments including rayon, cellulose esters, vinyl resin fibers, condensation polymer fibers including polyamides and polyesters and the like. The web may be a result of a single card or it may be desirable to superpose plurality of such single card webs to build a mat of greater thickness for a given end use. In such a built up mat different layers may be disposed at different angles with respect to their fiber orientations so as to give greater strength to the built up web. The length of the fibers is usually at least about 2 centimeters with lengths about 4 centimeters being preferred although ones as short as one centimeter and longer than 5 centimeters are useful in some instances. A wide range of fiber deniers is useful with the range of 1–3 denier being preferred.

Polyethylene fibers include the conventional low density monofilament fibers typically having a density in the neighborhood of 0.92 grams per cc and having a break tenacity of the order of 1 to 3 grams per denier. This material begins to soften at about 105° to 115° C. and exhibits melting in the neighborhood of 110° to 125° C.; it begins to exhibit 5 to 8% shrinkage in the neighborhood of 75° to 80° C. and 50 to 60% shrinkage at about 100° C. Another polyethylene useful for fibers is monofilament linear high density polyethylene, also available as a flat fiber, having a break strength in the neighborhood of 3.5 to 7 grams per denier; a softening region of 115° to 125° C. and a melt region in the neighborhood of 125° to 140° C.; it exhibits only about 3 to 5% shrinkage in the neighborhood of 70°–75° C. and about 8 to 12% shrinkage at 100° C. The polypropylene fibers of this invention are commonly available as staple, monofilament and multifilament fibers which are generally isotactic. They have a density in the neighborhood of 0.95 to 0.96 grams per cc. The staple and tow have a breaking tenacity in the neighborhood of 3 to 6.5 grams per denier and a density about 0.90 to 0.91 grams per cc; the monofilament has a breaking tenacity slightly greater being about 3.5 to about 7 grams per dener and the same density; the multifilament material covers a wide range of strengths from about 2.5 to about 8 grams per denier and has the same density as the others. These polypropylene fibers generally soften in the range from 140° C. to 165° C. and typically melt in the region 160° C. to 180° C. and have up to about 5% shrinkage at 100° C. and typically 5 to 12% shrinkage at 130° C.

Because of the shrinkage of the polyolefin fibers at high temperatures, as mentioned above, drying and curing steps, employed in the adhesion of other materials to the polyolefins or with regard to adhesives used to bond polyolefins, are limited in temperature. Normally temperatures below 100° C. or 110° C. are preferred although temperatures up to 150° C., and perhaps a bit higher in some instances, may be employed with the more thermally stable of these fibers or for heat-setting. The polymers of the instant invention form stable bonds to the polyolefins when dried and, if desired, further cured. Although I do not wish to be bound by any theory of operation of these adherent or adhesive polymers, it is believed that this result is associated with the particular surface energetic properties of the adhesive polymers of this invention. The strength of the bond produced between the adhesive polymer and the polyolefin especially the untreated polyolefin particularly polypropylene is high even after air drying under ambient conditions. More often for solvent borne and particularly water borne systems, it is desirable to dry at elevated temperatures such as temperatures up to 100° C. For systems containing crosslinkers, catalysts may be present and these and even higher temperatures are often preferred. The higher temperatures and sometimes additional curing time is used in the crosslinking of polymers of this invention which by virtue of their containing self-crosslinking or crosslinkable mer units in the polymer are tailored to produce finished products in which the adhesive polymer is crosslinked. The crosslinking plus the peculiarly good wetting of the fibers by the adhesive polymer, which, having the appropriate surface energy properties and solubility in low solubility parameter solvents spreads on the fibers and wets them so as to interlock the fibers, thus develop a strong fabric of bound fibers.

Nonwoven fabrics of the type described herein are used in sanitary and health care fabric products, such as diapers, sanitary napkins, hospital drapes, disposable sheets and bedpads, as fiberfill, as garment linings, in simulated leather substrates and the like.

FLOCKING

Flocking is a process by which textile fibers are embedded into an adhesive on a substrate producing an article which normally has a velvet or suede-like hand or feel. Polyolefins may be used as the fibers embedded and may also be used as the substrate; in either use the polyolefin is the substrate of the instant invention. The flocking process is carried out by passing a substrate, coated or printed with a composition comprising the adhesive polymer, through an electrical field in which short fibers are electrostatically directed and oriented into the adhesive. In another technique, a beater bar orients and embeds the fibers by means of vibration. Still other techniques combine both the electrostatic field and a beater bar presumably yielding optimum flock orientation and density. Using the adhesive polymer of this invention flock fabrics having a soft hand and great durability are readily achieved particularly when employing crosslinkable adhesive polymers including both self-crosslinking systems and externally crosslinked systems with polymers having reactive functional mer units. These systems, both crosslinked and uncrosslinked, are made with appropriate degrees of durability to washing and drycleaning, atmospheric oxidation and ultraviolet and heat degradation appropriate to the intended end use. Excellent color retention and ease of dyeing are further advantages imparted by the adhesive polymer of this invention having quaternary ammonium mer units, e.g. those of Lewis et al., supra. The solution polymer form of these adhesive polymer systems has advantages when lower molecular weights are desired, in situations where even traces of surfactants are undesirable and in the ease with which certain monomers may be incorporated in the polymer etc. The emulsion form of the polymers is particularly attractive in the safe handling of aqueous systems, ease of cleanup, when the properties associated with high molecular weight are desired, and ease of blending with other polymer emulsion, etc. For example the dyable quaternary ammonium mer units may be in a blend latex so the combined blend exhibits the stable bond to the polyolefin and the excellent dyeability.

BACKCOATING OF FABRICS

In the manufacture of tufted carpets the adhesive polymer or blends comprising the polymer are used for the primary backing, for tuftlock, for adhesion of a secondary backing, or for adhesion of a foam backing serving as an integral cushion for the carpet. Other examples of backcoated fabrics are imitation fur and pile fabrics wherein the adhesive polymer serves to lock the tuft and pile and to produce an article of excellent hand and durability. Mattress ticking fabrics are backcoated to produce a fabric of improved hand, integrity, handleability, printability and abrasion resistance of the face of the fabric. Among the advantages in backcoating an upholstery fabric with the adhesive polymer of the instant invention is the improvement in hand, durability and abrasion resistance of the face of the fabric. Polyolefin films and woven or nonwoven fabrics are used as these backing materials. It is estimated that 65% of the primary backings used in tufted carpets are slit woven polypropylene, 20% are spun bonded polypropylene nonwovens and only 15% are jute. At present, almost all secondary carpet backing is jute which both costs more and has many undesirable properties as compared with the polyolefin materials. However, despite their many advantages, the polyolefin backing materials are notoriously resistant to dyeing. Surface coverings incorporated such backings exhibit "grin-through", the undesirable visibility of the polyolefin backing when the tufted surface covering is creased or bent back upon itself. Grin-through is especially pronounced in shag carpeting when there is a mismatch between coloration of the backing and the face yarns. Thus the combination of the adhesive binder of the instant invention having quaternary ammonium mer units, as described above, and polyolefin backing material produces superior binding qualities and improved dye receptivity. When the coated polyolefin backing is dyed, the backing as well as the face yarn tufted into the backing is tightly locked into a unitary whole and the polyolefin backing material will be masked from view. Because of the feasibility of getting excellent bonding by means of low temperature drying, improved drying efficiency and economy of operation are possible without sacrifice in performance. In addition to providing excellent adhesion to the polyolefin, the adhesive polymers of this invention having quaternary ammonium mer units provide excellent dye pickup which is controllable so that the polyolefin backing material may be dyed on-shade with the face yarns thereby producing a uniform appearance while also masking any unsightly appearing backings.

Any form of polyolefin substrate material which can be tufted to form a surface covering can be used, including films and various woven and nonwoven forms, such as woven slit film and spun-bonded polyolefins. The polyolefins include any such materials used as surface covering backings, such as polyethylene, polyolefins containing two to six carbon atoms, wherein such copolymers contain at least 85% by weight of such olefin units, as defined by the Textile Fiber Products Identification Act (Public Law 85-897). Woven slit films or spun-bonded films of polypropylene are preferred. The face yarns may be any type of yarn conventionally used in the tufting of polyolefin substrates to form surface coverings, such as nylons, acrylics, polyesters and other synthetic yarns including blends of snythetic alone or with natural fibers.

When the adherent polymer comprises quaternary ammonium mer units any dyes of the direct and acid dye classes, such as the sulfonated dyes, may be used for the dyeing. The polyolefin backing material may be dyed separately from the face yarns or, more usually, the face yarns and polyolefin substrate will be dyed simultaneously after the coating and tufting steps. The dye levels are those conventionally employed in the dyeing of polyolefin surface coverings, and any dyeing technique may be used including Kuster dyeing, beck dyeing and printing techniques. The polymeric coating is applied at least to that side of the polyolefin substrate from which the face yarns will project after tufting, but it has also been found useful to back-coat the polyolefin substrate before or after tufting to more tightly lock in the face yarns to the substrate and, in the case of woven or nonwoven backings, to also stabilize the backing material against distortion and fraying. If a secondary backing material is used, it also may be coated and dyed in accordance with the invention, if desired.

One of the outstanding advantages of the invention is that no separate curing step is required to achieve resistance to a dye cycle. The polymeric coatings are self-curing upon elimination of water or solvent, which elimination can be effected by permitting the coated substrate to dry under ambient room conditions or the curing can be accelerated by conventional drying techniques. The high temperature levels usually required for curing of other polymeric binders can be avoided and therefore the problem of possible damage to the substrate when, for example, the temperature approaches the melting point of the polyolefin material.

It has been found, further, that the good substrate masking properties achieved by the improved dyeability permit reduction in face yarn density and high speed dyeing with different colors. In the past, masking of the substrate has required high surface yarn density or the needlepunching of another yarn layer into the backing. The expense of such approaches can now be avoided. The invention thus opens up polyolefin backings to use in tufted upholstery fabrics since, heretofore, primary backings for such uses have been limited to backings of rayon or other fibers which accept dyes naturally.

LAMINATES

In one embodiment of this invention the adhesive polymers of this invention, or compositions comprising them, serve to bond a polyolefin substrate to another substrate, comprising a bulk object, a sheet or a film. Useful objects are obtained by incorporating the properties of the second sheet or film with a polyolefin film in such way as to produce a laminate having the desirable features of both. For example, the vapor or moisture barrier characteristics or the sunlight protection characteristics may be improved by the other film while the polyolefin serves to improve the slip, strength or coefficient of friction characteristics as its contribution to the properties of the laminate. Thus, a laminate can be made which is more heat sensitive than the polypropylene in order to improve film heat sealability at a relatively low temperature or to produce a coating which is readily painted, lacquered, printed or decorated in some other manner. Of course, the adhesive polymer of the instant invention may produce these latter properties without the necessity of a second film; however, in some cases the fabricator may prefer the second film approach for other reasons.

The articles of this invention can be prepared by coating one surface of a polyolefin substrate, such as a film, with the adhesive polymer of the instant invention. The coating can be accomplished by a simple operation in which a solution or dispersion of the copolymer in a volatile vehicle is applied to the film by spraying, brushing, rolling, dipping, or similar technique. Thereafter, the vehicle is removed by evaporation leaving an adherent layer of the copolymer. The coating can also be applied by the so-called hot melt technique wherein the film is dipped into the melted coating, or a film can be cast from a solution of the copolymer and the cast film melted on the surface of the polyolefin. Other known coating techniques are also applicable. The thickness of the adherent layer of copolymer is not critical, but for optimum results should be from about 0.02 to about 3.0 mils.

Alternatively the adhesive polymer may be applied to the other substrate or to both the other and the polyolefin substrate. The last of these is exemplified by the application of the adhesive polymer in the nip formed between the two substrates, such as between moving films each being carried by suitable rollers. In each case the polyolefin and other substrate are firmly joined by the adhesive polymer between them. Of course, both substrates may be polyolefin.

The composition of the adhesive polymer or, if used in a blend, the blend can be adjusted to provide good adhesion to the non-olefinic surface in cases in which the laminate comprises such surface. For example, if the other surface is of higher energy or is more polar, the adhesive polymer or blend is modified in these directions while remaining within the limits required for stable bonding to the polyolefin.

Suitable materials which can be used as the other film in accordance with the present invention to produce laminated articles are thermoplatic film-forming polymers and include a second polyolefin film of, for example, the hydrocarbon polymers such as polyethylene (both low and high density), poly(butene-1), polypropylene, mixtures of polyethylene and polypropylene, and mixtures of polypropylene and polybutylene; and other films such as poly(vinyl acetate); poly(vinyl chloride); poly(vinylidene chloride); vinyl chloride/vinyl acetate interpolymers; vinyl chloride/vinylidene chloride interpolymers; copolymers of vinylidene chloride with, for example, acrylonitrile, methacrylonitrile; the alkyl, aryl, alkaryl, aralkyl or cycloalkyl acrylates or methacrylates; the alkoxy alkyl acrylates or methacrylates; the haloalkyl acrylates or methacrylates, alkyl-α-halo acrylates; methyl isopropenyl ketone and methyl vinyl ether; poly(vinyl propionate); poly(vinyl chloroacetate); poly(vinyl naphthalene); poly(ethyl vinyl ether); polyesters such as poly(ethylene terephthalate) and copolyesters of ethylene terephthalate and ethylene isophthalate; polyamides such as poly(hexamethylene adipamide), poly(hexamethylene sebacamide), polycaproamide, N-methoxymethyl poly(hexamethylene adipamide), polyacrylamide, polymethacrylamide and poly(N-vinyl succinimide); poly(vinyl acetals) such as poly(vinyl butyral); poly(vinyl fluoride); poly(vinylidene fluoride); vinyl fluoride/vinylidene fluoride interpolymers; poly(chlorotrifluoroethylene); poly(tetrafluoroethylene); interpolymers of tetrafluoroethylene with hexafluoropropylene; vinylfluoride/tetrafluoroethylene interpolymers; vinylidene fluoride/hexafluoroethylene interpolymers; poly(oxymethylene), poly(acrylonitrile); poly(vinyl pyridine); polymers of allyl glycidyl ether; cellophane; cellulose esters such as cellulose acetate and cellulose nitrate; rubber hydrochloride, and the like and even stereoregular polypropylene itself.

Particularly desirable films are those with low gas and moisture vapor transmission characteristics. These barrier layer materials are applied to the adhesion polymer surface coating on the polyolefin and they are exemplified by vinylidene chloride polymers, vinyl chloride polymers, vinylidene fluoride polymers and copolymers of these with other materials usually being at least 70 weight percent of these or a combination of the monomers corresponding to these homopolymers. The vinyl halide polymers may include light stabilizers, plasticizers, heat stabilizers and other additives well known in the art and generally found advantageous in such films.

FLUID COATINGS

Decorative ink and paint coatings of the types well known in these art fields are adherent to polyolefins when the polyolefin has a surface coating comprising the adherent polymer of this invention. In the same way complete or partial layers of other films can be applied onto the adherent polymer from either an aqueous latex or a solution in a volatile organic solvent. The coating of this type may be applied by dipping, spraying, brushing, rolling, doctoring, painting, printing or the like in a conventional manner. The adhesive polymer of this invention can serve as a tiecoat to bind such systems to the polypropylene and to make available a wettable surface on the polypropylene for the application of the water borne or organic solvent borne system. An alternative to this tiecoat procedure is to utilize the adhesive polymer as the binder or vehicle for the paint or ink or to use it as a portion of the binder or vehicle in which case a sufficient amount of the adhesive polymer of this invention is to be used so that the paint or ink has the surface energy properties necessary for good bonding onto the polyolefin. Drying and curing steps if desired are similar to those described above.

The following abbreviations are used in this specification:
CHMA: cyclohexyl methacrylate
BA: butyl acrylate
$VV_{10}$: vinyl monomer $VV_{10}$ (Shell Chemicals)
nDA: n-decyl acrylate
nDMA: n-decyl methacrylate
IDA: isodecyl acrylate
tBuSt: t-butyl styrene
St: styrene
$C_{10}AM$: N-decyl acrylamide
EA: ethyl acrylate
VA: vinyl acetate
2-EHA: 2-ethylhexyl acrylate
BDA: butylene diacrylate
IDMA: isodecyl methacrylate
AA: acrylic acid
MMA: methyl methacrylate
IA: itaconic acid
AN: acrylonitrile
$VCl_2$: vinylidene chloride
AM: acrylamide
1,4BDA: 1,4 butylene diacrylate
MOA: equimolar mixture of acrylamide and methylol acrylamide
1,3BDA: 1,3 butylene diacrylate
MIPAP: $\beta$-methacryloxy propyl acid phthalate (mixed propyl groups)
DMF: dimethyl foramide
MEK: methyl ethyl ketone
THF: tetrahydrofurane
PP: polypropylene The following examples illustrate the use of the polymers of this invention in coating or bonding polyolefin, particularly propylene and the coated products produced thereby. All parts and percentages are by weight unless indicated otherwise. The following materials and test methods are used in the examples unless in the given example another or a modification is specified.

EVALUATION TESTS

1. Adhesion

Several tests are used to evaluate the adhesive vinyl addition polymer adhesion onto polypropylene including tape tests, knife and eraser adhesion tests and an adhesive peel strength test.

The tape tests require applying a portion of a tape onto a polypropylene substrate coated with the adhesive polymer system being evaluated. The remainder of the piece of tape is held so a forty five degree angle is made with the plane of the adhered portion of tape and the polypropylene substrate. The tape is then pulled rapidly by hand. This procedure is repeated after using a knife to inscribe a "X" through the adhesive polymer coating on the polypropylene substrate. The tape is then applied over the inscribed area and pulled rapidly at a forty five degree angle as before. Two different tapes are used in this test: Acetate Fibre Tape #710 (3M Company); and TFE Plastic Film Tape #5490 a 3.5 mil tape (3M Company). The tape test results are ranked as follows: P-pass, no loss of binder film off the polypropylene substrate; VSF-very slight failure, only very slight removal of binder film (up to ca. 25%) on area covered by tape; SF-slight failure, some removal of binder film (25–50%) on area covered by tape; F-failure, over 50% removal of film on area covered by tape.

In the eraser test three successive draw downs (approximately 2 in. length) of an eraser (Efeberhand Faber #101) are made across the area of polypropylene substrate coated with the film being evaluated. The results are ranked as follows: P-pass, no exposure of uncoated polypropylene substrate; SF-slight failure, some exposure of polypropylene substrate (up to ca. 50%); F-failure, complete exposure of polypropylene substrate.

The knife blade test consists of scraping a knife blade across the coated polypropylene substrate with the knife blade perpendicular to the direction of draw down. The results are ranked qualitatively as the amount of drag or resistance present against the knife blade: P-pass, good resistance against knife blade and narrow furl formed; SF-slight failure, moderate resistance with narrow furl formed; F-failure, almost no resistance and wide furl formed.

Three methods are used to conduct the 180° adhesion peel strength test. In the first, the adhesive polymer is applied as an acetone solution onto 0.15 inch thick polypropylene sheet (Amoco #6011) with a #5 wire wound rod, dried (220° F./2 min) coated with a topcoat, dried (220° F./2 min) and laminated to eighty square cotton fabric (Style #400M, Testfabrics Inc.) with a soft textile binder polymer and dried 2 min/220° F. In the second method the polymer being evaluated is used to saturate eighty square cotton which is then used to laminate the polypropylene sheet and dried (125° C./2 min). One inch wide strips are cut across the panels. The cotton fabric and polypropylene panels are inserted in opposite jaws of an Instron and tested at crosshead speeds of one inch/min and twelve inches/min. In the third method an adhesive polymer tiecoat is applied by a #5 wire wound rod onto the polypropylene sheet (Amoco #6011), air dried at room temperature for 5-10 min. The topcoat, such as Polymer J, is coated on top of the tiecoat with a #75 wire wound rod and dried in a 180° F. oven for 4 min. Mylar film is laminated to the topcoat in a press at 30 psi (2000 g/sq cm) for 20 sec at room temperature. In each method a 180° peel strength test is performed on an Instron test machine at a specified cross head speed. All samples are held at ambient conditions for at least ten hours then conditioned at 72° F. and 60 relative humidity for one hour before testing. Two test values agreeing within ten percent are accepted, if the first two do not so agree three or four are run to obtain an average deviation of ten percent or less. In other respects the general procedure of ASTM test method D-903 is followed.

2. Solubility

Solubility profiles are measured by adding a weighed amount of polymer film (0.1-0.5 g) to 20-25 ml of a non-hydrogen bonding solvent and determining the solubility after 3 days of intermittent agitation. The solubility is determined by separating, drying and weighing the undissolved portion of the film. Solubility parameters ranged from 6.8 to 8.2 for the solvents used: isooctane, n-pentane, 1-hexane, diisobutylene and cyclohexane, ("Polymer Handbook, 2nd ed.", J. Brandrup, E. H. Immergut, J. Wiley and Sons N.Y. 1975). The solvents are available and further described as follows:

(a) 2,2,4-trimethylpentane, (isooctane) Reagent ACS Eastman, Eastman Kodak Co., Rochester, N.Y. 14650

(b) pentane, 98% Aldrich, Aldrich Chemical Co., Inc., Milwaukee, Wisc. 53233

(c) 1-hexene, 99% Aldrich, supra, (d) diisobutylene, (practical) Eastman, (e) cyclohexane, ACS Reagent, Aldrich, supra.

For crosslinked polymers or crosslinkable polymers the solubility measurements are performed before the crosslinking is effected, this is normally the condition in which the polymer is applied to the polyolefin.

3. Contact Angle Measurements and Surface Energy Determinations

The equations given by D. K. Owens and R. C. Wendt in Journal of Applied Polymer Science, Vol. 13, p. 1741 (1969) are used to determine polymer surface energy. Materials and Equipment:

(a) Diiodomethane (methylene iodide), Aldrich 99%, stabilized with copper and stored in the dark, is used.

(b) Water is deionized with Technical Amberlite Monobed® MB-3 Ion Exchange Resin (Rohm and Haas Company) before use.

(c) Polymer films are cast on Mylar® film, free from surface irregularities using RDS Coating Rods (#5-30).

(d) Contact angle measurements are made using a Contact Angle Goniometer System, Model A100 (Rame-Hart Inc., 43 Bloomfield Ave., Mountain Lake, N.J. 07046). Droplets of water and methylene iodide ranging from 2-4 mm in diameter are deposited by means of a micrometer head microsyringe on a level polymer film. The advancing contact angle of the static liquid drop is measured directly by using the Model A100 gonimeter. Measurements are made immediately after the liquid drop is placed on the polymer surface under ambient conditions (22±0.5° C.). Each contact angle value is an average of 5 separate determinations. The maximum deviation from the mean for a specific system is 2°; if a greater deviation is observed (rarely) more measurements are made.

As described by Owens and Wendt, contact angle measurement of water and methylene iodide against a solid lead to simultaneous equations which are solved for the polar and nonpolar component of the solid surface energy with the total surface energy being the sum of these two components.

The equation used to determine surface energy is $$1 + \cos\theta = 2\sqrt{F_S^D}\left(\sqrt{\frac{F_L^D}{F_L}}\right) + 2 F_S^P\left(\sqrt{\frac{F_L^P}{F_L}}\right) \quad \text{(Eq. 1)}$$

wherein
$\theta$ is the measured advancing contact angle.
F is a surface free energy.
D is a superscript indicating the nonpolar dispersive component of F.
P is a superscript indicating the polar component of F.
S is a subscript indicating that the surface is between a solid and air
L is the corresponding subscript for a liquid-air surface.

Equation 1 differs from Equation 7 of Owens and Wendt in the identification "polar component" for their "hydrogen bonding component" and in the interfaces (surfaces) being with air rather than the saturated vapor. The total surface energy of a solid is given by $F_S = F_S^D + F_S^P$ (Eq. 2)

The three symbols in Equation 2 are referred to, respectively, elsewhere in this specification as: SE, the total surface energy; DCE, the nonpolar dispersive component of the surface energy; and PCE, the polar component of the surface energy. The dispersive component, polar component and total surface energies used in the calculations are 21.8, 51.0 and 72.8 ergs./sq. cm., respectively, for water and 48.5, 2.3 and 50.8 ergs./sq. cm., respectively, for methylene iodide (see J. R. Dann, J. Colloid and Interface Science Vol. 32, p 302 (1970)).

The polyolefin substrates in the various examples are "untreated polyolefin", that is, the polypropylene surface has not been treated by electrical, chemical or other means to make it more easily wettable by water, organic solvents and other polymers. Surface energy measurements performed on various polyolefin substrates give the following values:

|  | SE | DCE | PCE |
|---|---|---|---|
| Amoco Fabrics, Amoco #6011 polypropylene sheet | 38.6 | 36.5 | 2.1 |
| Avisun, Olefane Type 3.0 AT2 polypropylene film | 38.9 | 33.4 | 5.5 |
| Polybac TM polypropylene woven slit film rug scrim, Patchogue Plymouth Division of Amoco Fabrics | 38.5 | 38.3 | 0.2 |
| Standard grade polypropylene sheet, Commercial Plastic Supply Corporation | 35.6 | 30.1 | 5.5 |
| Avisun, Olefane TM Type 3.0 AT2 corona treated polypropylene film | 44.1 | 32.5 | 11.6 |
| Exxon, PP-12B-SHT, 3 mil corona treated polypropylene | 45.7 | 28.1 | 17.6 |
| Mobil Chemical Company, medium density polyethylene film corona treated | 49.2 | 15.3 | 33.9 |
| Mobil Chemical Company, medium density polyethylene film | 35.8 | 29.4 | 6.4 |
| Volara TM Foam, Valtek, Inc., Lawrence, Mass. Polyethylene foam | 39.8 | 38.8 | 1.0 |
| Ethylene-propylene dimer rubber | 33.2 | 32.0 | 1.2 |

EXAMPLE 1

Cyclohexyl Methacrylate Emulsion Polymer

A reaction kettle equipped with a mechanical stirrer, reflux condenser, thermometer and suitable ports, is flushed with nitrogen for 15 minutes. The vessel is charged with 300 parts of water, 1 part ammonium persulfate and is heated to 80° C. under nitrogen. In a separate vessel a monomer emulsion is prepared as follows:
  60 parts water
  0.13 parts ammonium persulfate
  10 parts Alipal ® EP-110 (30%) (GAF Corporation)
  140 parts cyclohexyl methacrylate (CHMA)
  60 parts butyl acrylate (BA)

The monomer emulsion is added continuously to the heated kettle for 60 minutes maintaining the reaction temperature at 80° to 85° C. After completion of the addition the temperature is maintained for 40 minutes whereupon the polymer emulsion is cooled to room temperature and filtered. The product is at 34.7% solids and has a pH of 2.0. To obtain a product with higher polymer solids the amount of water in the initial charge is decreased; e.g., decreasing the initial charge to 175 parts of water results in a product at about 45% solids.

In place of Alipal EP-110 other anionic surfactants such as sodium lauryl sulfate, sodium dodecylbenzene sulfonate, tetrasodium N-(1,2-dicarboxyethyl)N alkyl ($C_{18}$) sulfosuccinate, disodium salt of half ester of sulfosuccinic acid derived from a $C_{10}$-$C_{12}$ straight chain alcohol mixture, disodium salt of half ester of sulfosuccinic acid derived from an ethoxylated nonylphenol or anionic/nonionic surfactants such as Abex ® VA-50 (Alcolac Inc) may be used, as may mixtures of these as well as mixtures with well known nonionic surfactants.

EXAMPLE 2

Redox Emulsion Polymer

A reaction kettle equipped as in Example 1 is flushed with nitrogen for 15 minutes. The kettle is charged with the following kettle charge:
  653 parts water
  9.6 parts octylphenoxypoly(39)ethoxyethanol (70%)
  45 parts ferrous sulfate solution (0.1%)
  12.5 parts tetrasodium ethylenediamine tetraacetic acid solution (1%) (Dow Chemical)
  56 parts butyl acrylate (BA)
  56 parts $VV_{10}$ Vinyl monomer ($VV_{10}$) (Shell Chemicals)

The kettle charge is warmed to 40° C. under nitrogen and a seed initiator consisting of 0.83 parts diisopropylbenzene hydroperoxide and 0.23 parts sodium formaldehyde sulfoxylate in 15 parts of water is added. Polymerization starts almost immediately with a 14° C. temperature rise. The temperature is maintained at 55°–60° C. for 20 minutes and a seed stabilizer consisting of 9.6 parts of the octylphenoxy polyether recited above is added in 15 parts of water. The reaction temperature is adjusted to 60° to 65° C. and monomer emulsion is added gradually for 185 minutes. The monomer emulsion consists of:
  141 parts of water
  48.3 parts octylphenoxypoly(39)ethoxyethanol (70%)
  506 parts BA
  506 parts $VV_{10}$
  7.4 parts diisopropylbenzene hydroperoxide An initiator solution consisting of 2 parts of sodium formaldehyde sulfoxylate and 112.5 parts of water is fed to the reaction kettle as a cofeed with the monomer emulsion. Upon completion of these gradual addition feeds, two parts of diisopropylbenzene hydroperoxide and 0.56 parts of sodium formaldehyde sulfoxylate in 31 parts of water are added to the reaction mixture maintaining the temperature at 60°–65° C. for 10 minutes. The polymer emulsion is then cooled to room temperature and filtered. It has 48.7% solids and is at a pH of 3.0. Other surfactants such as those described in Example 1 may be used in place of the octylphenoxy polyether.

EXAMPLE 3

BA/$VV_{10}$ Solution Polymer

A reaction kettle equipped with a stirrer, reflux condenser, thermometer and graduated addition funnel, is flushed with nitrogen for 15 min. The flask is charged with 150 parts toluene and heated to reflux. A solution of 75 parts BA, 75 parts $VV_{10}$ and 1.5 parts benzoyl peroxide is added continuously over 5 hr. while maintaining reflux. After the gradual addition is completed, 0.08 parts benzoyl peroxide in 5.0 parts toluene is added and the reflux maintained for an additional 30 min. The solution is cooled to room temperature; it has 42.3% polymer solids.

EXAMPLE 4

CHMA Bulk Polymer

A reaction kettle equipped as in Example 3 is flushed with nitrogen for 15 min. The flask is charged with 50 parts CHMA and 0.25 parts Luazo ® 79 (Pennwalt, Lucidol Division) and heated to 90°–95° C. in a hot water bath. After the reaction raises the temperature to 140° C. an additional 0.25 parts Luazo 79 (2-t-butylazo-2-cyanopropane) is added while the temperature is maintained at 90°-95° C. for 30 min. The flask is cooled to room temperature and the polymer is diluted with toluene for use.

lated high molecular weight values obtained using the Fox equation and the tables in Polymer Handbook 2nd edition J. Brandrup and E. H. Immergut, Wiley Interscience New York, N.Y. 1975 pp III-139-192.

Inspection of the data in the table shows that polystyrene is significantly poorer than the other polymers in adhesion to the polypropylene sheet.

| | Bulk Polymer Adhesion to Polypropylene Sheet | | | | | | | |
|---|---|---|---|---|---|---|---|---|
| Example | Composition | $T_g$ °C. (Calc) | Acetate Tape | Teflon Tape | SE | DCE | PCE | Solubility Avg. g/100 ml |
| 5a | nDA | | P | P | 38.4 | 38.4 | 0 | 0.36 |
| 5b | nDMA | −70 | P | P | 23.8 | 21.8 | 2.0 | 0.45 |
| 5c | IDA | −61* | P | P | 37.1 | 36.8 | 0.3 | 0.57 |
| 5d | IDA/CHMA (75/25) | −37 | P | P | — | — | — | 0.78 |
| 5e | IDA/CHMA (50/50) | −7 | P | P | 34.0 | 30.2 | 3.8 | 0.64 |
| 5f | IDA/CHMA (25/75) | +23 | P | P | — | — | — | 0.94 |
| 4 | CHMA | +83 | P | P | 41.9 | 36.9 | 5.0 | 0.63 |
| 5g | tBuSt | +130 | P | P | 35.8 | 35.7 | 0.1 | 0.58 |
| 5h | BA/VV$_{10}$ (50/50) | −31 | P | P | 35.3 | 34.3 | 1.0 | 0.98 |
| 5i | St | +100 | F | F | 43.1 | 40.2 | 2.9 | 0.04 |
| 5j | C$_{10}$AM | +40 | P | P | 27.7 | 25.7 | 2.0 | 1.10 |
| 5k$^x$ | CHMA/BA (10/90) | | SF | P | | | | |
| 5l$^x$ | VV$_{10}$/BA (10/90) | | P | P | | | | |
| 5m$^x$ | CHMA/BA (10/90) | | P | P | | | | |
| 5n$^x$ | VV$_{10}$/BA (10/90) | | F | F | | | | |

*measured by differential scanning calorimetry
$^x$The substrate for Examples 5k, l, m and n is Avisun Olefane ™ Type 3.0 AT2 polypropylene film, untreated.

EXAMPLE 5

Preliminary Tests

The adhesion of a number of bulk polymerized polymers, prepared by the procedure of Example 4, and two emulsion polymers, prepared by the procedure of Example 1, to polypropylene sheet (Amoco #6011) is determined by the tape test, not X-scribed, and the eraser test. The bulk polymers are applied from a dilute toluene solution. The emulsion polymers are applied as neat emulsion, for Experiments 5K and 5l, and thickened (5m and 5n) with 2% Cellosize QP-4400 and raised to a pH of 9 by ammonia. Determination is also made of the surface energy and its dispersive and polar components and of the solubility of the polymer in the non-hydrogen bonding solvents ranging in solubility parameter from 6.8 to 8.2. The results of the measurements are in the following table wherein those given under the heading "solubility" are the average values as noted in the test method procedure. The Tg values are calculated

EXAMPLE 6

Use as a tiecoat

A 5% solution in acetone of the adherent polymer is applied to polypropylene sheet (Amoco #6011) with a number 5 wire wound rod and dried by placing in a 105° C. oven for 2 minutes. The adherent polymer tiecoat is made by the process of Example 1 so the 5% solids is actually in a water-acetone solution having been attained by diluting the latex, as prepared, with acetone. After the tiecoat is oven dried, a second coat or topcoat of a binder of the prior art is applied using the wire wound rod and following it by oven drying as before. In a series of controls the topcoat is applied, by the same steps of wire wound application and drying but in the absence of a tiecoat. The compositions of the tiecoats are given along with the results of tape, eraser and knife tests for adhesion in the following table.

| | Tiecoat-Topcoat Adhesion to Polypropylene Sheet | | | | | | |
|---|---|---|---|---|---|---|---|
| | Tiecoat | | Topcoat | Acetate | Teflon | | |
| Example | Composition | $T_g$ (°C.) | Comp'n | Tape-X | Tape-X | Eraser | Knife |
| 6a1 | none | | A | F F | — — | SF | F |
| 6a2 | BA/VV$_{10}$ (1:1) | −31 | A | P P | P P | P | P |
| 6b1 | none | | B | F F | — — | SF | SF |
| 6b2 | BA/VV$_{10}$ (1:1) | −31 | B | P P | P P | P | P |
| 6c1 | none | | C | F F | — — | F | F |
| 6c2 | BA/VV$_{10}$ (1:1) | −31 | C | P SF | SF SF | P | F |
| 6d1 | none | | D | F F | — — | F | F |
| 6d2 | BA/VV$_{10}$ (1:1) | −31 | D | P F | F F | P | F |
| 6e1 | none | | E | F F | F F | F | F |
| 6e2 | BA/VV$_{10}$ (1:1) | −31 | E | P P | F F | P | F |
| 6f1 | | | F | F F | — — | F | F |
| 6f2 | BA/VV$_{10}$ (1:1) | −31 | F | P P | SF SF | F | F |
| 6g1 | none | | G | F F | — — | F | F |
| 6g2 | BA/VV$_{10}$ (1:1) | −31 | G | P P | F F | P | F |
| 6h1 | none | | H | P F | F F | F | F |

-continued

| | | | | | | | | |
|---|---|---|---|---|---|---|---|---|
| 6h2 | BA/VV$_{10}$ (1:1) | −31 | H | P | P | P | F | SF | SF |
| 6h3 | CP-343-1[2] | | H | P | P | F | F | P | P |
| 6h4 | none | | H | F | F | — | — | F | F |
| 6h5 | EA | −24 | H | F | — | F | — | F | F |
| 6h6 | VA | +32 | H | F | — | F | — | F | F |
| 6h7 | BA | −54 | H | F | — | F | — | F | F |
| 6h8 | VA/VV$_{10}$ (62.5/37.5) | +17 | H | F | F | — | — | F | F |
| 6h9 | BA/VV$_{10}$ (50/50) | −31 | H | P | P | P | F | SF | SF |
| 6h10 | 2-EHA/IDA/BDA (49.5/49.5/1.0) | −55 | H | P | F | F | — | F | F |
| 6h11 | CHMA | +83 | H | P | — | P | — | F | — |
| 6h12 | IDA | −61 | H | P | — | F | — | F | F |

Footnotes
[1]Essentially the same results are obtained when the acetone solvent used in the application of the tiecoat is replaced by any of the following solvents: 2-ethoxy ethanol, dimethyl formamide, methylethyl ketone, tetrahydrofurane, toluene, xylene or mixtures of these in which the tiecoat is soluble.
[2]CP-343-1 is a chlorinated polyolefin supplied by Eastman Kodak Company.
[3]The tiecoat materials are all latex polymers prepared by the process of Example 1.
[4]The topcoats are various textile binders; A, C, D, F, and G having N—methylolamide crosslinking functionality and are of the type described in U.S. Pat. No. 3,100,674, herein incorporated by reference, having glass transition temperatures ranging from −47° C. to +33° C. Topcoat B is a vinyl acetate analog of these materials. Topcoat H employs a different crosslinking functionality described in U.S. Pat. No. 3,678,098.
[5]The surface energy and solubility of the various tiecoat polymers is given in the following table:

| Composition | SE | DCE | PCE | Solubility Avg. g/100 ml |
|---|---|---|---|---|
| CP-343-1 | 40.0 | 36.6 | 3.4 | 0.58 |
| BA/VV$_{10}$ (1:1) | 33.3 | 33.1 | 0.2 | 0.95 |
| EA | 46.3 | 24.9 | 21.4 | 0.07 |
| VA | 53.2 | 28.9 | 24.3 | 0 |
| BA | 35.7 | 26.2 | 9.5 | 0.25 |
| VA/VV$_{10}$ (62.5/37.5) | 25.9 | 15.7 | 10.2 | 0.24 |
| 2 EHA/IDA/BDA(49.5/49.5/1.0) | — | — | — | — |
| CHMA | 42.0 | 38.1 | 4.1 | 0.58 |
| IDA | 38.2 | 36.8 | 1.4 | 0.45 |

[6]$T_g$ values of VV$_{10}$ polymers are based on the value −3° C. for the homopolymer given in Shell Chemicals Technical Bulletin RES:VVX:3 (3rd edition) identified, on its last page, as T2437/1.76
[7]The $T_g$ value for the IDA tiecoat is a measured value obtained by differential scanning calorimetry.

EXAMPLE 7

Binder Polymer Blended with Adherent Vinyl Polymer

In these examples, polymer H used in the Examples 6h 1-12, is blended with 20 parts of an adherent polymer. Example 7a is an unblended control.

Blend Additive Application

The blend additive approach used in 7c and 7d is attractive since the adherent polymer and the binder of interest can be applied in a one step operation as opposed to the two step applications described above.

Blend Formulation 10.2 g polymer of Example 2 (48.7% solids)
45.0 g of the following formulation:
   100 g Polymer H (46.5%)
   0.3 g Cellosize® QP-4400 (3%)
   3.6 g H$_2$O
   2.5 g Zonyl FSN® (50%)
   3.0 g Sodium bicarbonate The blended formulations are applied to polypropylene sheet, film, or rug scrim using a #5 wire wound rod or Gardner Knife (for the scrim) with uniform coating. Example 7d employs the blend in the form of a foam formulated and applied as follows:

The blends are applied to Amoco #6010 polypropylene sheet, Amoco Polybac® and DuPont Typar®. All give the same results in the acetate tape test, the Teflon tape test and the eraser test as recorded in the table below. In all cases the adhesive failure is at the tiecoat-polypropylene interface.

The blend of Example 7c has the following surface energy values: SE is 33.4, DCE is 33.0 and PCE is 0.4.

| | Evaluation of Blended Adherent Polymer | | | | |
|---|---|---|---|---|---|
| Example | Blend | Acetate Tape-X | | Teflon Tape-X | | Eraser |
| 7a | Polymer H (Example 6h) | F | F | F | F | F |
| 7b | 20 parts CP-343-1 Eastman Kodak) 80 parts Polymer H | F | F | — | — | F |
| 7c | 20 parts polymer of Example 2 80 parts Polymer H | P | P | SF | SF | P |
| 7d | 20 parts polymer of Example 2 80 parts Polymer H, foamed | SF | — | SF | — | SF |

EXAMPLE 8

Tiecoat-Topcoat Adhesion on Polyethylene

Adhesive polymers of this invention, applied in acetone solution, are used as a tiecoat between polymer H, applied as a thickened emulsion, and an untreated polyethylene film with the following results:

| Tiecoat-Polymer H(Topcoat) Adhesion Evaluation on Polyethylene Film | | | | | |
|---|---|---|---|---|---|
| Example | Tiecoat | Acetate Tape-X | | Teflon Tape-X | | Eraser |
| 8a | none | F* | F* | F* | F* | F |
| 8b | Ex. 6a2+ | F | F | F | F | P |

-continued

| Tiecoat-Polymer H(Topcoat) Adhesion Evaluation on Polyethylene Film | | | | | |
|---|---|---|---|---|---|
| Example | Tiecoat | Acetate Tape-X | | Teflon Tape-X | Eraser |
| 8c | Example 2 | P | SF | F | F | P |
| 8d | CP-343-1 | F | F | F | F | F |
| 8e | of Ex. 5k | F | | P | |
| 8f | of Ex. 5l | SF | | F | |

Footnotes:
F* very poor adhesion, large area beyond that covered by tape is removed.
+Tiecoat is a 1:1 BA/VV$_{10}$ copolymer prepared by a thermal process as in Example 6a2. CP-343-1 is Eastman Kodak chlorinated polyolefin. All failures are at the tiecoat-polyethylene interface.

EXAMPLE 9

Peel Strength Testing of Tiecoat-Topcoat Systems on Polypropylene

Employing the cotton-fabric technique given above, the 180° peel strength of tiecoat-topcoat combinations on polypropylene sheets (Amoco #6011) is determined using the peel rates (crosshead speed) of one inch/minute (2.54 centimeters per minute) and 12 inches per minute (30 centimeters per minute). The values obtained are in the following table:

| Polypropylene Adhesion Evaluation using 180° Peel Strength Test for Tiecoat-Topcoat Combinations | | | | | |
|---|---|---|---|---|---|
| | | Peel Strength (lbs/in) | | | |
| Example | Tiecoat/Topcoat | 2.5 cm | 10 cm | 30 cm | Failure |
| 9a | Polymer H/ Polymer L | 0.33 | — | 0.89 | adhesive to PP |
| 9b | Polymer L/ Polymer L | 0.45 | — | — | adhesive to PP |
| 9c | of Ex. 8b/ Polymer H | 1.05 | — | 2.67 | mixed |
| 9d | of Ex. 8c/ Polymer H | 1.09 | — | 2.67 | mixed |
| 9e | Polymer J/ Polymer J | — | 0.1 | — | adhesive to PP |
| 9f | BA/IDMA/AA (24.5:75:0.5)/ Polymer J | — | 7.5 | — | adhesive to PP |

Notes:
1. Evaluation performed on Amoco #6011 polypropylene sheets.
2. Polymer L is a latex of 87.5 EA/10.0 MMA/2.5 IA made by emulsion polymerization.
3. Mixed failure is cohesive in topcoat plus adhesive to the polypropylene (PP).
4. Peel Strength are at jaw separation rates of 2.5, 10 and 30 cm per minute (see column heading).

EXAMPLE 10

Peel Strength Test of Adhesives on Polypropylene

Various adhesives are applied to polypropylene and laminated to 80 square cotton fabric as described above. Adhesion strength values are determined using the 180° peel strength test employing an Instron Tester with the crosshead speed of 12 inches per minute (30 centimeters per minute). The polypropylene used is Amoco #6011 in the form of sheets. The results in the following table show that adhesive failures at comparatively low strengths occur with ordinary polymers. When polymers of this invention are employed, the failures occur at higher strengths except when the polymers are extremely soft polymers whereupon the softness gives rise to cohesive failures at comparatively low strength values. All adhesive failures are at the polypropylene surface.

| Ex. | Polymer | Polym'n Procedure | Strength (lbs/in) | Failure Type | Calculated T$_g$ (°C) |
|---|---|---|---|---|---|
| 10a | EA | Expl. 2 | 0.7 | Adhesive | −24 |
| 10b | BA | Expl. 2 | 1.0 | Adhesive | −54 |
| 10c | Polymer H | Expl. 2 | 0.5 | Adhesive | −24 |
| 10d | Polymer J* | Expl. 2 | 0.7 | Adhesive | −24 |
| 10e | Polymer G | Expl. 2 | 0.4 | Adhesive | −24 |
| 10f | BA/VV$_{10}$ (1:1) | Expl. 2 | 2.8 | Cohesive | −31 |
| 10g | EA/VV$_{10}$ (1:1) | Expl. 2 | 2.0 | Mixed cohesive | −14 |
| 10h | BA/IDMA (1:1) | Expl. 1 | 1.9 | Cohesive | −47 |
| 10i | BA/IDA/IDMA (1:1:1) | Expl. 1 | 1.9 | Cohesive | −49 |
| 10j | BA/IDA (1:1) | Expl. 1 | 1.0 | Cohesive | −57 |
| 10k | 2-EHA/IDA (1:3) | Expl. 1 | 1.0 | Cohesive | −58 |
| 10l | 2-EHA/IDMA (1:3) | Expl. 1 | 1.2 | cohesive | −42 |
| 10m | Polymer M (see Example 14d) | Expl. 1 | 0.4 | Adhesive | −15 |

*Polymer J is a fabric binder differing from Polymer H in having a lower level of crosslinker mer units in the polymer. It is also of the type described in U.S. Pat. No. 4,014,645, herein incorporated by reference.

EXAMPLE 11

Polypropylene-Urethane Foam Laminates

In urethane foam to polypropylene laminations, the urethane foam is in contact with a topcoat of the type of system described previously. Amoco #6011 polypropylene (PP) sheets and flexible polyester-urethane foam (Reeves, Scott and Goldmills) are laminated by applying an adherent vinyl addition polymer tiecoat to polypropylene and using pressure sensitive polymer J or K as a topcoat. Polymer K is softer than polymer J, being based on BA and EA rather than EA alone, and has the same crosslinker units. Example 11a is a control employing no tiecoat. The adhesion is determined in a peel strength test performed by hand. The operator grasps the foam piece in one hand and the polypropylene in the other and pulls them apart. The force needed is estimated relative to other samples and the location of the failure is observed. The following two tables give the test results and the compositions.

| Example | Topcoat | Adhesion Performance | Failure |
|---|---|---|---|
| 11a | Polymer J | poor | |
| 11b | Polymer J | good | topcoat-tiecoat |
| 11c | Polymer J | excellent | cohesive in urethane |
| 11d | Polymer J | poor | topcoat-tiecoat |
| 11e | Polymer J | poor | topcoat-tiecoat |
| 11f | Polymer K | good | topcoat-tiecoat |
| 11g | Polymer J | poor | tiecoat-PP |

-continued

| Example | Topcoat | Adhesion Performance | Failure |
|---------|---------|----------------------|---------|
| 11h | Polymer J | poor | tiecoat-PP |
| 11i | Polymer K | poor | tiecoat-PP |
| 11j | Polymer J | fair | cohesive in tiecoat |

The tiecoat adherent polymers and their surface energy and solubility in non-polar solvents is described in the following table. All are prepared by the process of Example 1 except that used in Example 11j which is prepared by the process of Example 2.

| Example | Tiecoat Composition | SE | DCE | PCE | Avg. Solubility g/100 ml |
|---------|---------------------|------|------|------|--------------------------|
| 11b | 70 CHMA/30 BA | 37.7 | 26.5 | 11.4 | 0.49 |
| 11c | 69.5 CHMA/30 BA/0.5 AA | 41.3 | 26.8 | 14.5 | 0.68 |
| 11d | 69 CHMA/29 BA/2 AA | 46.5 | 31.1 | 15.4 | 0.58 |
| 11e, f | 65 CHMA/30 BA/5 MMA | 39.5 | 25.4 | 14.1 | 0.44 |
| 11g | 60 CHMA/30 BA/10 MMA | 46.9 | 30.9 | 16.0 | 0.31 |
| 11h, i | 50 CHMA/30 BA/20 MMA | 55.9 | 26.9 | 29.0 | 0.26 |
| 11j | $VV_{10}$ | 31.0 | 29.6 | 2.4 | 1.14 |

EXAMPLE 12

Lamination to Rigid Polypropylene

The rigid polypropylene sheet is made by extruding Amoco PP 6011 resin by means of a David-Standard Thermotic II 4.5 inch extruder having an L/D of 36/1 and a screw compression rato of 3.5/1 (with mixing pins). The resin has a melt flow of 0.5 g per 10 minutes.

12a. A BA/IDMA/AA (24.7/74.8/0.5) adherent addition polymer, prepared by the method of Example 1 at 45% solids, is neutralized to pH 7.4 with aqueous ammonia and thickened with ½% Cellosize QP-4400. 2 wet mils of this mixture is coated on a rigid polypropylene plastic sheet and dried 10 min. at 80° C. This dried tiecoat is then over-coated with 5 mils catalyzed and thickened Polymer J, at 45% solids, and dried 8 min. at 80° C. A textile fabric is adhered to this coated surface in a press at 30 psi pressure. The laminate is cured 5 min at 120° C. The laminate has 6 lbs/in peel strength at room temperature, pulled at 10 cm/min on an Instron tester in a 180° test configuration. The failure is in adhesion to the polypropylene.

12b. A laminate is made in the same way as in Example 12a except that the tiecoat is not dried before it is over-coated with Polymer J. Similar test results are obtained.

12c. A laminate is made in the same way as in Example 12a except that unsupported polyvinyl chloride (PVC) film, in place of the fabric, is adhered to the coated surface. Three lbs/in peel adhesion is obtained; the failure is at the PVC interface.

12d. The same laminate as in Example 12c is made except that the PVC film face is coated with ½ mil of Polymer J containing 10% xylene, then dried for 4 min. at 80° C. The laminate has 6 lbs/in peel strength; the failure is in adhesion to the polypropylene.

12e. A laminate the same as in Example 12c, except that a fabric backed PVC film is adhered to the coated surface is prepared. The peel strength and failure region are essentially the same as in Example 12c.

12f. A laminate the same as Example 12a, except that polyurethane-polyester foam is adhered to the coated surface, is prepared. Peel strength is found to be limited to the ca 3 lb/in tear strength of the foam, the location of the failure.

A laminate the same as 12f, except that the adherent addition polymer is replaced by Polymer J, is prepared and tested; the peel strength is 0.2 lbs/in with adhesive failure to the polypropylene.

The laminates of this invention, described in Example 12 are useful as shaped panels for the interior decoration of automobiles, marine vehicles, mobile homes and recreational vehicles, for furniture, wall dividers and other decorative and utilitarian objects including clothing, handbags, etc. Peel strength values of 2 or 3 lbs/in or, in more demanding applications, 5 lbs/in are required for such uses.

EXAMPLE 13

Laminations to Flexible Polypropylene Surfaces

13a. A 3-mil thick film of polypropylene (Avisun Olefane ™) is coated with 2½ wet mils of a 70/30 mixture of Polymer J and the adherent addition polymer of Example 12a, each at 45% solids, catalyzed to pH 7-7.2 with sodium sesquicarbonate solution and thickened with ½% Cellosize QP-4400. The coated film is dried 8 min/100° C. This dried tiecoat is over-coated with 6 wet mils catalyzed Polymer J thickened with Cellosize QP-4400, then dried 8 min/80° C. A 6 oz/yd² warp knit nylon fabric is adhered to the coated surface in a press at 30 psi. The laminate is cured 5 min/120° C. The film could be removed from the fabric only with destruction of the film at a force estimated to be about 25 lbs/in.

13b. The same laminate, as in Example 13a, is made except that a 3.3 oz/yd² scrim fabric woven from slit film polypropylene filaments (Polybac ®) is used in place of the polypropylene film. The scrim could not be removed from the fabric without difficulty.

Such laminates are useful as linings in automobile and other interiors, as draperies and as other decorative covers.

EXAMPLE 14

Flocked Polypropylene Surfaces

14a A rigid polypropylene sheet, as in Example 12, is coated with ½ wet mil of the Example 12a adherent vinyl addition polymer, at 45% solids, thickened with ½% Cellosize QP-4400 and neutralized to pH 7.0-7.4 with aqueous ammonia. The coating is dried 6 min/80° C. This tiecoat is over-coated with 13 mils of Polymer J, at 45% solids, catalyzed, and thickened to 30,000 cps with Cellosize QP-4400. The wet overcoat is beater bar flocked with 0.025 inch nylon flock (1.5 denier) and dried 12 min. at 100° C. This dried, flock coated plastic is cured 5'/280° F. and tested as described below.

14b. The same as Example 14 a except a 3-mil polypropylene film is used, as in Example 13a.

14c. The same as Example 14b except a scrim fabric woven from polypropylene filaments is used, as in Example 13b.

14d, e and f. The same series as Examples 14a, b and c except that Polymer J is replaced by Polymer M, a self-crosslinking acrylic polymer of the type taught in U.S. Pat. No. 3,678,098. The results are the same as in Examples 14 a, b and c.

14g, h and i. The same as Examples 14d, e and f except that the tiecoat polymer is composed of BA/VV$_{10}$/an unsaturated quaternary monomer of U.S. Pat. No. 3,678,098, herein incorporated by reference (48.5/48.5/3). This tiecoat polymer is an adherent polymer prepared by the method of Example 2a. Test results are the same as those in Examples 14d, e and f.

Samples from the above Examples 14 a through i survive five home launderings whereas similar samples employing Polymer J without an adherent polymer of this invention survive no more than one home laundering.

Flock coated, shaped polypropylene plastic items are used in the interior decoration of automobiles other vehicles, homes and in clothing, personal furnishings, etc.

EXAMPLE 15

Flocked Polypropylene Surface with Single Coat Adherent Polymer

15a. A 10 wet mil coating of 70/30 mixture of Polymer J with the Example 12a adherent polymer, each at 45% solids, is applied to a 10-mil polypropylene film and flocked with nylon flock as in Example 14. This is dried 12 min/80° C. then cured 5 min/120° C. The product survives five home launderings.

15b. The same as Example 15a except a fabric woven from polypropylene filament is employed in place of the polypropylene film. The final product survives five home launderings.

15c and d. The same as Examples 15a and 15b respectively except a 40/60 mixture of Polymer M and the Example 12a adherent polymer emulsion is used. The products survive five home launderings.

When Polymer J alone is used as the adhesive coating the flocked fabric does not survive even one wash cycle.

Such flock-coated items are used to decorate the interior of automobiles and homes, as linings, in draperies, etc.

EXAMPLE 16

Polystyrene to Polypropylene Laminating Adhesive

This example describes a pressure-sensitive adhesive formulation which is used to laminate an 8.1 oz/yd$^2$ needle punched polypropylene non-woven to Amoco Amcore TM Board (a layered polystyrene/foamed polystyrene/polystyrene). The adhesive is prepared by formulating a polymer of this invention, having the composition 48.5 BA/48.5 VV$_{10}$/3 quaternary monomer, of Example 14g, as follows:

|  | Parts by Weight |
|---|---|
| Polymer of Example 14 g (52% solids) | 100.0 |
| Pre-mix { Cellosize QP-4400 | 0.05 |
| H$_2$O | 0.25 |
| 15% Sodium sesquicarbonate | 4.0 |

The adhesive is sprayed onto the polystyrene composite to give a wet add-on of approximately 11 grams/ft$^2$, and dried in a high velocity forced air oven for 2 minutes at 80° C. The polypropylene non-woven is then placed in contact with the dried adhesive and the two are "married", or laminated, in a press at room temperature and a pressure of 100 psi for 3 seconds. The resulting laminate has a peel adhesion in excess of 5 lbs/inch (180° peel) as compared to only about 0.5 to 1 lbs/inch for conventional pressure-sensitive adhesives (Use of Polymer J as the adhesive results in a peel strength of about 1 lb/inch with failure in adhesion to the polyproylene). After conditioning for one week at room temperature, the laminate exhibits resistance to extremes in environmental conditions such as high heat (180° F.), humidity (100% RH/100° F.) and soaking in cold water. These properties make the laminate ideal for many applications, such as scuff panels or carpeting in the interior of automobiles.

EXAMPLE 17

Nylon Carpet

Ten carpet examples are prepared using as the rug-backing adhesive (a) the blend of Example 7c, (b) the foamed blend of Example 7d, (c) the tiecoat-topcoat system of Example 9c, (d) of Example 9d and (e) of Example 9f. Each of these is used with each of two types of polypropylene rug backing, namely Typar ® (DuPont Co., a spunbonded polypropylene nonwoven) and Poly-Bac ® (Amoco Chemicals Co., a woven fibrillated slit film scrim) both supplied without finishes or lubricants. A 1300 denier/2 ply (2600 denier total) bright finish nylon yarn is used for preparing a level loop carpet on a 16 inch width small pass tufter. Conditions are set to yield nylon tufts comprising 8 stitches-/inch, ⅜ inch gauge, and a ¼ inch level loop pile height. As expected from the results of Examples 7 and 9, the backing is strongly bonded to the carpeting.

A Beck or batch type dyeing procedure is used in which the water to weight of goods (carpet) ratio is held at 50 to 1. The nylon carpet with a polypropylene rug backing coated with the acid dyeable polymer topcoat or blend is pre-wetted at 200°-205° F. for 5 minutes. A pH 6.5 buffer solution consisting of 0.133 part of monosodium phosphate, 0.033 part of disodium phosphate, and a sufficient quantity of water to yield a total of 100 parts is added to the dye bath along with a typical acid dye, Merpacyl ® Red "B" (DuPont Co.) 2% dye based on total weight of goods. The dye bath is held at 200°-205° F. for 10 minutes; drained; and the carpet rinsed with warm water. Drying is done in a conventional clothes dryer. Lack of "grin through" of the rug backing is found for each carpet and is used as the criterion for acceptable dyeability of the acid dyeable polymer coating adherent to the polypropylene by the tiecoat of this invention.

EXAMPLE 18

Pigment Printing

A conventional paste is prepared of three major ingredients: pigment, thickener and binder. Before these ingredients are mixed to form a print paste, a "cut clear" is formed with a thickener. The cut clear is prepared by dissolving 6% by weight of a nonionic thickener in water and mixing for about 30 minutes to form a translucent gel having a consistency over 100,000 cps. The cut clear functions as a viscosity builder in the paste.

Next a color concentrate is prepared by blending a presscake dispersion (a pigment dispersion in water), a cut clear, and water for about 15 minutes until a creamy flowing paste of about 1950 cps viscosity results.

A print paste is formed by mixing the color concentrate and a suitable emulsion binder, the latter consisting of a low energy curing acrylic polymer which is co-blended with an adherent polymer having the surface properties and solubility needed for promoting adhesion to polypropylene substrates. The latter may also comprise low enery curing mers. The resultant binder to pigment ratio is in the range 2/1 to 3/1 in order to obtain optimum print color and durability. The print paste compositions used in this example are:

EXAMPLE 18a

Printing Paste

A control print paste is prepared by mixing the following, as described above: 60 parts of a cut clear containing 6% of the nonionic thickener, 4.3 parts of 35% Aquahue ™ Blue BGR 9511 aqueous pigment dispersion, 30 parts water, 5.8 parts of a 60% solids acrylic binder (97 EA/3 a low energy heat curable quaternary ammonium salt vinyl monomer of U.S. Pat. No. 3,678,098) and 0.175 part sodium bicarbonate as catalyst. The resultant print paste viscosity is about 40,000 cps.

EXAMPLE 18b

Printing Paste

A print paste is prepared by mixing the following as described above: 66.67 parts of a cut clear containing 6% of the nonionic thickener, 4.3 parts of 35% Aquahue Blue BGR 9511 aqueous pigment dispersion, 23.0 parts water, 4.38 parts of the acrylic binder of Example 18a, 1.8 parts of a 48.7% polypropylene adhesive addition polymer (48.15% BA, 48.15% $VV_{10}$, 0.7% AA, and 3.0 parts low energy heat curable quaternary ammonium salt vinyl monomer) and 0.175 part sodium bicarbonate as catalyst. The resultant print paste viscosity is about 10,000 cps.

EXAMPLES 18a and b

Pigment Printed Nonwoven Polypropylene

The pigment paste is applied to Kimberly-Clark spunbonded pinsonic embossed nonwoven polypropylene fabric, weighing about 1.6 oz/yd², by the screen printing process and then cured by heating in a conventional oven at 228° F. for 3 minutes. The printed fabrics are washed in a conventional washing machine using a ¼ cup of commercial Tide ® detergent. The results are described in the following table:

| Wash Durability of Polypropylene Printed Fabrics | | |
|---|---|---|
| | Printed Fabric Sample | |
| Wash Durability | Example 18a (control) | Example 18b |
| 1 wash cycle | poor-fair | very good |
| 5 wash cycles | poor | good |

EXAMPLE 19

Urethane Foam Laminated to Polypropylene

Other than the tiecoat, an adherent polymer of this invention, the materials and methods are the same as those of Example 11. All of the tiecoat polymers used in the various portions of this example are prepared by the process of Example 1. The composition of the tiecoat polymers and the results of testing the strength of the laminate, urethane foam/polymeric topcoat/tiecoat/polypropylene, is given in the following table.

| Example | Tiecoat Composition | Topcoat Polymer | Adhesion Performance | Failure |
|---|---|---|---|---|
| 19a1 | CHMA/BA/AN (62.5/31.2/6.3) | J | fair | tiecoat to PP |
| 19a2 | CHMA/BA/AN (62.5/31.2/6.3) | K | fair | mixed tiecoat to PP and topcoat to tiecoat |
| 19b1 | CHMA/BA/AN (66.3/31.2/2.5) | K | good | topcoat to tiecoat |
| 19c1 | CHMA/BA/AN (68.6/30.2/1.2) | J | fair | topcoat to tiecoat |
| 19c2 | CHMA/BA/AN (68.6/30.2/1.2) | J | good | topcoat to tiecoat |
| 19d1 | CHMA/BA/VCl$_2$ (65/25/10) | J | fair | topcoat to tiecoat |
| 19d2 | CHMA/BA/VCl$_2$ (65/25/10) | K | excellent | foam tear |
| 19e1 | CHMA/BA/VA (65/30/5) | J | fair | topcoat to tiecoat |
| 19e2 | CHMA/BA/VA (65/30/5) | K | good | mixed topcoat to tiecoat, tiecoat to PP, foam tears |
| 19f1 | CHMA/BA/AM (68/30/2) | J | fair | mixed tiecoat and topcoat |
| 19f2 | CHMA/BA/AM (68/30/2) | K | good | mixed tiecoat, topcoat and foam tears |
| 19g1 | CHMA/BA/St (65/30/5) | J | fair | tiecoat to PP |
| 19g2 | CHMA/BA/St (65/30/5) | K | excellent | foam tears |
| 19h1 | CHMA/BA/AM/AA (68.6/29.9/1.0/0.5) | J | good | topcoat to tiecoat |
| 19h2 | CHMA/BA/AM/AA (68.6/29.9/1.0/0.5) | K | excellent | foam tears |
| 19i1 | tBuSt/BA/AA (59.5/40/0.5) | K | good | topcoat to PP |

EXAMPLE 20

Adherent Polymer Used as a Tiecoat

Using the same substrate and procedures as in Example 6, a number of other tiecoat compositions are tested by the acetate tape test. The topcoat in each case is polymer H. The adherent polymer is prepared as a latex by the method of Example 1 or Example 2 as noted in the table below. The table also gives the compositions and the acetate tape test results.

| Example | Tiecoat Composition | Prep'n Example | Acetate Tape | X |
|---|---|---|---|---|
| 20a | BA/$VV_{10}$/1,4 BDA (49.75/49/75/0.5) | 1 | P | P |
| 20b | BA/$VV_{10}$/1,4 BDA/ AA (49.5/49.5/0.5/0.5) | 1 | P | P |
| 20c | EA/BA/$VV_{10}$/AA (88.1/5.4/5.4/1.1) | 2 | P | F |
| 20d | BA/$VV_{10}$/1,4 BDA (74.6/24.9/0.5) | 1 | P | F |
| 20e | $VV_{10}$/BA/1,4 BDA (74.6/24.9/0.5) | 1 | P | P |
| 20f | BA/$VV_{10}$/MOA/1,4 BDA (48.75/48.75/2.0/0.5) | 1 | P | F |
| 20g | BA/$VV_{10}$/1,4 BDA (49.25/49.25/1.5) | 1 | P | SF |
| 20h | $VV_{10}$/2-EHA/1,4 BDA (49.75/49.75/0.5) | 1 | P | P |
| 20i | $VV_{10}$/IDA/1,4 BDA (49.75/49.75/0.5) | 1 | P | P |
| 20j | IDA/2-EHA/1,4 BDA (49.75/49.75/0.5) | 1 | P | F |
| 20k | BA/$VV_{10}$/1,3 BDA | 1 | P | P |

| Example | Tiecoat Composition | Prep'n Example | Acetate Tape | X |
|---|---|---|---|---|
| 20l | (49.75/49.75/0.5) BA/VV₁₀/1,3 BDA/ AA (49.75/49.75/0.5/0.6) | 2 | P | P |
| 20m | BA/IDA (25/75) | 2 | P | F |
| 20n | IDA/IDMA/2-EHA/BA (25/25/25/25) | 1 | P | F |
| 20o | CHMA | 1 | P | P |
| 20p | IDA/CHMA (25/75) | 1 | P | P |
| 20q | IDA | 1 | P | P |
| 20r | EA/CHMA (50/50) | 1 | P | P |
| 20s | BA/CHMA (50/50) | 2 | P | P |

The following polymers, prepared by the method of Example 2, also exhibit strong adherent bonding to untreated polypropylene:
BA/VV₁₀/MIPAP/1,3 BDA (49.45/49.45/0.6/0.5)
BA/VV₁₀/IA/1,3 BDA (49.5/49.5/0.5/0.5)
BA/VV₁₀/VCl₂ (37.5/37.5/25)

EXAMPLE 21

Polypropylene Nonwoven Fabric

A nonwoven fabric of polypropylene fibers is prepared by using the adherent polymer of the instant invention as the binding agent for a nonwoven web of polypropylene fibers. The adherent polymers used in this example are prepared by the process of Example 1 except for Example 21c which is prepared by the process of Example 2. The adherent polymer latex is diluted to about 7% solids in water and is used to saturate the nonwoven web of polypropylene fibers. Saturation is done in a bath and the saturated web passed through nip rollers under 13.6 killograms pressure at 7.0 meters per minute. The web is dried at 65° C. for 5 minutes and then cured at 107° C. for 90 seconds.

The polypropylene webs are prepared from 3.0 denier, 4.0 centimeter long, polypropylene staple lightly thermally prebonded. The carded webs weigh 25 grams per square meter.

The finished fabrics are tested for wet tensile strength after soaking for 30 minutes in room temperature water and after being blotted lightly with a towel upon removal from the water bath. Specimens are cut to 2.5 centimeter by 16.5 centimeter in the machine direction and are tested on an Instron ® tester with a jaw separation of 12.7 centimeters and an extension rate of 5.1 centimeters per minute. Dry tensile strength is measured in the same way on the Instron tester but the sample is just room temperature conditioned at 50% relative humidity. The tensile strength test results are given in the table below.

As a measure of fabric water resistance, important for uses such as cover cloths for diapers, sanitary napkins, bedpads and other application for nonwoven fabrics requiring adequate tensile strength and abrasion resistance when wet by water or aqueous systems such as body fluids, the ability of the fabric to withstand wash cycles in a home laundered is indicative. The testing is done in a Maytag home launderer at full load, warm (43° C.) or hot (60° C.) water setting utilizing no soap and a ballast of 8 terrycloth bath towels. Failure is defined as the fragmentation of the fabric into two or more pieces or to the point at which the fabric becomes so entangled (and thus distorted) as to be judged unuseable. The ability to withstand 10 or 15 cycles is sufficient for many uses. Passing 25 cycles at 43° C. is considered more than adequate for the uses specified above.

| Example | Composition | % Addon | Tensile MD (lb/in) Dry | Tensile MD (lb/in) Wet | Wash Survival 43° C. | Wash Survival 60° C. |
|---|---|---|---|---|---|---|
| 21a | BA/CHMA (60/40) | 44 | 14.7 | 13.0 | over 25 | 19 |
| 21b | BA/tBuSt (60/40) | 44 | 12.6 | 12.1 | over 25 | 12 |
| 21c | EA/VV₁₀ (50/50) | 40 | 4.7 | 6 | over 25 | — |

I claim:

1. An article comprising an untreated polyolefin substrate and adherent thereto, a blend of a first latex polymer and a vinyl addition adherent latex polymer of monomers consisting essentially of (1) at least 5% by weight of a primary monomer selected from
(a) monomers having the formula

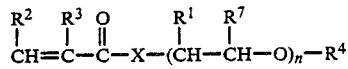

wherein
X is —O—, —NH— or —NR⁵—;
R¹ and R⁷, individually, are H, methyl or ethyl;
R² is H, —COOH, —CONH₂, or —COOR⁶;
R³ is H, alkyl having up to 5 carbon atoms, —CH₂COOR⁶, —COOR⁶ or —CH₂COOH;
R⁴ and R⁵, individually are monocyclic alkyl having six to twenty carbon atoms, acrylic alkyl having nine to twenty carbon atoms, or alkaryl having nine to eighteen carbon atoms;
R⁶ is hydrocarbyl; and
n having a value of from zero to about ten;
(b) vinyl esters of alkanoic acids having eight to twenty carbon atoms;
(c) alkyl substituted styrene wherein the substituent group or groups have a total of three to fifteen carbon atoms; and
mixtures thereof; said adherent polymer having surface energy properties such as to form a stable bond with said substrate.

2. The article of claim 1 wherein the substrate is a flock.

3. The article of claim 1 wherein the substrate is a nonwoven.

4. The article of claim 1 wherein the substrate is a film.

5. The article of claim 1 wherein the substrate is a rigid sheet.

6. The article of claim 1 wherein the substrate is a yarn.

7. The article of claim 1 wherein the substrate is monofilament.

8. The article of claim 1 wherein the vinyl addition polymer contains one or more substituted ethylene supplementary monomers.

9. The article of claim 1 having at least 2% of the adherent latex polymer in the blend and wherein the adherent latex polymer has a total surface energy between about 22 and 42 dynes per cm, said energy having a nonpolar dispersive component between about 20 and about 38 dynes per cm and a polar component up to about 15 dynes per cm, the polar component being not over 36% of the total surface energy, the adherent latex polymer also having an average solubility greater than 0.25 gm. per 100 ml. in isooctane, n-pentane, 1-hexane, diisobutylene and cyclohexane; the monomers consisting of primary and supplementary monomers wherein the supplementary monomer or monomers have an average solubility parameter, by weight, of 8.8 or less.

10. The article of claim 9 wherein the primary monomer comprises at least 25% by weight of (a), (b), (c) or a mixture thereof and wherein the supplementary monomer or monomers have an average solubility parameter, by weight, of 9.2 or less.

11. The article of claim 10 wherein the polyolefin is polypropylene and the adherent latex polymer is about 10% to about 60% of the blend by weight.

12. The article of claim 11 wherein the primary monomer comprises at least 50% by weight of (a), (b), (c) or a mixture thereof.

13. The article of claim 12 wherein the primary monomer is a vinyl ester of an alkanoic acid having at least eight carbon atoms.

14. The article of claim 12 wherein the primary monomer has the formula:

$$\begin{array}{cccc} R^2 & R^3 & O & R^1 & R^7 \\ | & | & \| & | & | \\ CH=C-C-X-(CH-CH-O)_n-R^4 \end{array}$$

wherein
X is —O—, —NH— or —NR$^5$—;
R$^1$ and R$^7$, individually, are H, methyl or ethyl;
R$^2$ is H, —COOH, —CONH$_2$, or —COOR$^6$;
R$^3$ is H, alkyl having up to 5 carbon atoms, —CH$_2$COOR$^6$, —COOR$^6$ or —CH$_2$COOH;
R$^4$ and R$^5$, individually, are monocyclic alkyl having six to twenty carbon atoms, acrylic alkyl having nine to twenty carbon atoms, or alkaryl having nine to eighteen carbon atoms;
R$^6$ is hydrocarbyl; and
n having a value of from zero to about ten.

15. The article of claim 14 wherein the primary monomer is decyl acrylate, decyl methacrylate, cyclohexyl acrylate, cyclohexyl methacrylate or a mixture thereof.

* * * * *